United States Patent [19]
Iorio et al.

[11] Patent Number: 5,867,883
[45] Date of Patent: Feb. 9, 1999

[54] EXTRUDED MULTIPLE PLASTIC LAYER COATING BONDED TO THE OUTER SURFACE OF A METAL TUBE HAVING AN OPTIONAL NON-REACTIVE INNER LAYER AND PROCESS FOR MAKING THE SAME

[75] Inventors: Ralph A. Iorio, Bloomfield Hills; Robert M. Davie, Lapeer; James D. McDaniel, Ortonville; Frank L. Mitchell, Rochester; Tao Nie, Macomb, all of Mich.

[73] Assignee: ITT Industries, Inc., New York, N.Y.

[21] Appl. No.: 897,369

[22] Filed: Jul. 21, 1997

Related U.S. Application Data

[63] Continuation of Ser. No. 452,328, May 26, 1996, abandoned, Division of Ser. No. 401,011, Mar. 8, 1995, Pat. No. 5,520,223, which is a continuation-in-part of Ser. No. 260,523, Jun. 16, 1994, Pat. No. 5,490,542, and Ser. No. 237,610, May 3, 1994, Pat. No. 5,590,691.

[51] Int. Cl.$^6$ .......................... B21D 35/00; B23P 19/04; B05D 3/12
[52] U.S. Cl. .......................... 29/460; 29/469.5; 427/409; 427/327
[58] Field of Search .......................... 29/469.5, 527.2, 29/527.4, 460, 516; 264/177.17; 427/409, 433, 419.1, 321, 327, 328, 295

[56] References Cited

U.S. PATENT DOCUMENTS

| | | |
|---|---|---|
| 2,210,338 | 8/1940 | Quarnstrom . |
| 2,255,472 | 9/1941 | Quarnstrom . |
| 2,508,465 | 5/1950 | Offinger et al. . |
| 3,070,132 | 12/1962 | Sheridan . |
| 3,166,688 | 1/1965 | Rowand et al. . |
| 3,311,134 | 3/1967 | Howard . |
| 3,405,228 | 10/1968 | Polizzano . |
| 3,473,087 | 10/1969 | Slade . |
| 3,561,493 | 2/1971 | Maillard et al. . |

(List continued on next page.)

FOREIGN PATENT DOCUMENTS

| | | |
|---|---|---|
| 0164766 | 12/1985 | European Pat. Off. . |
| 0436923 | 7/1991 | European Pat. Off. . |

(List continued on next page.)

OTHER PUBLICATIONS

J. Margolis, Conductive Polymers and Plastics, pp. 119–124.
Shell Chemical Co., Kraton Rubber Automotive Compound Characteristics.

(List continued on next page.)

*Primary Examiner*—S. Thomas Hughes
*Assistant Examiner*—Tisa Stewart
*Attorney, Agent, or Firm*—Thomas N. Twomey

[57] ABSTRACT

A multi-layer tube having a metal tube having an outer surface and a zinc layer bonded to the metal tube outer surface. The zinc layer being selected from the group consisting of zinc plating, zinc nickel alloys, zinc cobalt alloys, zinc aluminum alloys, and mixtures thereof. A surface treatment layer is bonded to the zinc layer, wherein the surface treatment layer is selected from the group consisting of a zinc/aluminum/rare earth alloy, phosphate, chromate and mixtures thereof. A first polymeric layer is bonded to the surface treatment layer, wherein the first polymeric layer is selected from the group consisting of a thermoplastic elastomer, an ionomer, a nylon, a fluoropolymer, and mixtures thereof. A second polymeric layer is bonded to the first polymeric layer, wherein the second polymeric layer is selected from the group consisting of a nylon, a thermoplastic elastomer, a fluoropolymer, and mixtures thereof. The tube also has a continuous interior layer made of non-reactive material which is preferably made of a polymeric material which is substantially non-reactive in the presence of short chain alcohols. The process for manufacturing the multi-layer tubing of the present invention also includes the steps of positioning a length of non-reactive tubing into the interior of unsealed metal tube, sealing the metal tube with the non-reactive tubing contained within and extruding multiple layers of a melt-processible thermoplastic onto the external surface metal tube the external surface can be pretreated with at least a zinc based coating and a sealant coating on top of the zinc based coating.

22 Claims, 6 Drawing Sheets

U.S. PATENT DOCUMENTS

| | | |
|---|---|---|
| 3,584,655 | 6/1971 | Frank et al. . |
| 3,828,112 | 8/1974 | Johansen et al. . |
| 3,907,955 | 9/1975 | Viennot . |
| 4,059,847 | 11/1977 | Phillips et al. . |
| 4,243,724 | 1/1981 | Strutzel et al. . |
| 4,244,914 | 1/1981 | Ranalli et al. . |
| 4,272,585 | 6/1981 | Strassel . |
| 4,273,798 | 6/1981 | Scheiber . |
| 4,303,457 | 12/1981 | Johansen et al. . |
| 4,330,017 | 5/1982 | Satoh et al. . |
| 4,385,940 | 5/1983 | Kirihara et al. . |
| 4,448,748 | 5/1984 | Radtke et al. . |
| 4,614,208 | 9/1986 | Skarelius . |
| 4,659,394 | 4/1987 | Hara et al. . |
| 4,659,625 | 4/1987 | Decroly et al. . |
| 4,675,780 | 6/1987 | Barnes et al. . |
| 4,685,090 | 8/1987 | Krevor . |
| 4,706,713 | 11/1987 | Sadamitsu et al. . |
| 4,710,337 | 12/1987 | Nordstrom . |
| 4,762,589 | 8/1988 | Akiyama et al. . |
| 4,775,600 | 10/1988 | Adanjya et al. . |
| 4,800,109 | 1/1989 | Washizu . |
| 4,849,301 | 7/1989 | Kanasashi . |
| 4,853,297 | 8/1989 | Takahashi et al. . |
| 4,880,036 | 11/1989 | Kitami et al. . |
| 4,887,647 | 12/1989 | Igarashi et al. . |
| 4,907,625 | 3/1990 | Ito et al. . |
| 4,911,778 | 3/1990 | Barnoach ............ 264/171.17 |
| 4,944,972 | 7/1990 | Blembereg . |
| 4,948,643 | 8/1990 | Mueller . |
| 4,984,604 | 1/1991 | Nishimura . |
| 4,990,383 | 2/1991 | Bergstrom et al. . |
| 5,019,309 | 5/1991 | Brunnhofer . |
| 5,038,833 | 8/1991 | Brunnhofer . |
| 5,076,329 | 12/1991 | Brunnhofer . |
| 5,112,692 | 5/1992 | Strassel et al. . |
| 5,142,782 | 9/1992 | Martucci . |
| 5,143,122 | 9/1992 | Adkins . |
| 5,152,323 | 10/1992 | Shotts et al. . |
| 5,167,259 | 12/1992 | Brunnhofer . |
| 5,170,011 | 12/1992 | Martucci . |
| 5,219,002 | 6/1993 | Stenger et al. . |
| 5,219,003 | 6/1993 | Kerschbaumer . |
| 5,252,550 | 10/1993 | Yamauchi et al. ............ 29/599 |
| 5,258,213 | 11/1993 | Mugge et al. . |
| 5,271,977 | 12/1993 | Yoshikawa et al. . |
| 5,277,228 | 1/1994 | Yamanashi . |
| 5,284,184 | 2/1994 | Noone et al. . |
| 5,373,870 | 12/1994 | Derroire et al. . |
| 5,380,385 | 1/1995 | Derroire et al. . |
| 5,383,087 | 1/1995 | Noone et al. . |
| 5,425,817 | 6/1995 | Mugge et al. . |
| 5,524,673 | 6/1996 | Noone et al. . |

FOREIGN PATENT DOCUMENTS

| | | |
|---|---|---|
| 0551094 | 7/1993 | European Pat. Off. . |
| 1498725 | 9/1967 | France . |
| 2114550 | 6/1972 | France . |
| 2434326 | 3/1980 | France . |
| 2577168 | 8/1986 | France . |
| 2577564 | 8/1986 | France . |
| 7824662 | 3/1990 | France . |
| 3405640 | of 0000 | Germany . |
| 1779905 | 2/1972 | Germany . |
| 3821723 | 9/1989 | Germany . |
| 9001467 | 4/1990 | Germany . |
| 4001125 | 12/1990 | Germany . |
| 4001126 | 12/1990 | Germany . |
| 9007303 | 12/1990 | Germany . |
| 3942353 | 6/1991 | Germany . |
| 3942354 | 6/1991 | Germany . |
| 4006870 | 7/1991 | Germany . |
| 4025301 | 4/1992 | Germany . |
| 4137430 | 5/1993 | Germany . |
| 4214383 | 9/1993 | Germany . |
| 9400522 | 1/1994 | Germany . |
| 2204376 | 11/1988 | United Kingdom . |
| 2211266 | 6/1989 | United Kingdom . |
| 25835 | 12/1993 | WIPO . |
| 30105 | 11/1995 | WIPO . |
| 44186 | 11/1997 | WIPO . |

OTHER PUBLICATIONS

Shell Chemical Co., Material Safety Data Sheet, pp. 1, 3, 5 (Aug. 10, 1990).

Int'l Plastics Selector, Plastics Digest Thermoplastics and Thermosets, Ed. 14, vol. 2 (1993).

Huls America Inc., Product Information—Vestamid Nylon 12.

Advanced Elastomer Systems, Santoprene Thermoplastic Rubber—Product Data Sheet (Nov. 1991).

Std. Specification for Zinc—5% Al Mischmetal Alloy (UNS 238510) in Ingot Form . . . , pp. 669–670.

Tefzel—Safety in Handling and Use, pp. 1–3, 20–21, 35–37.

Material Safety Data Sheet, Central Glass Co., Ltd., pp. 1–2.

State of California Air Resources Board, pp. 1–2, A2–A4, B2–B43.

Rosato, Donald U. et al., Designing with Plastic and Composites: A Handbook, pp. B–18–B–33.

Product Data Bulletin, EMS Engineering Polymers.

Material Safety Data, Advanced Elastomer Systems, pp. 1–5, Santoprene Thermoplastic Rubber FR Grades.

Santoprene Thermoplastic Rubber, fluid resistance, Advanced Elastomer Systems, pp. 1–12.

Vichem Corporation, Material Safety Data Sheet.

Kraton, Processing and Fabricating Kraton thermoplastic rubber compounds, Shell Chemical Company, pp. 1–26.

Material Safety Data Sheet, Shell, pp. 1,3,5,1.

Kraton, Compound Properties Guide, Shell Chemical Company.

Kraton Rubber Automotive Compound Characteristics.

Kraton, Typical Properties 1990, Shell Chemical Company, pp. 1–11.

Sarlink 1000 Series, Material Safety Data Sheet, DSM, Thermoplastic Elastomers, Inc. Jan. 14, 1992, pp. 1–4.

Sarlink Thermoplastic Elastomers, The Alternative TPE.

Data Sheet, Sarlink 1570, Fuel Resistant Thermoplastic Elastomer For Marine Hose Applications.

Nonmetallic Air Brake System Tubing—SAE J844, Jun. 1990, SAE Standard.

Flexible Fluoroplastic CEFRAL SOFT, Central Glass Co., Ltd., pp. 1–20.

Safety Data Sheet, ATOCHEM.

Kirk–Othmer, Encyclopedia of Chemical Technology, 3rd Edition, vol. 18 (New York, John Wiley & Sons) pp. 406–425.

Standard Specification for Zinc—5% Aluminum—Mischmetal Alloy (UNS 238510) in Ingot Form for Hot Dip Coatings pp. 669–670.

Conductive Polymers and Plastics Chapman and Hall, New York, James M. Margolis, pp. 119–124.

Plastic Digest Thermoplastics & Thermosets, International Plastics Selector, Edition 14, vol. 2, 1993.

Principal Properties, 1992, D.A.F.A. Business Publishing pp. 2–116–2–119.
Surlyn, Industrial Extrusions Manual, pp. 1–30.
A Designer's Guide to Six Versatile, Use–Proven Plastic Resins from DuPont.
Product Guide, Tough and durable for long–lasting good–looking, lightweight products, DuPont.

Principal Properties, 1992, D.A.T.A. Business Publishing, pp. 2–1283–2–1284.

John W. Nicholson, The Chemistry of Polymers, pp. 147–149.

Material Safety Data Sheet, E. I. DuPont, Nov. 1985.

FIG·1

EXTRUDED MULTIPLE PLASTIC LAYER COATING BONDED TO THE OUTER SURFACE OF A METAL TUBE HAVING AN OPTIONAL NON-REACTIVE INNER LAYER AND PROCESS FOR MAKING THE SAME

RELATED APPLICATIONS

This application is a continuation of application Ser. No. 08/452,328, filed on May 26. 1996 now abandoned.

This application is a divisional application of U.S. Ser. No. 08/401,011 filed Mar. 8, 1995 which is now U.S. Pat. No. 5,520,223, which is a continuation-in-part of U.S. Ser. No. 08/260,523 filed on Jun. 16, 1994 now U.S. Pat. No. 5,490 542 and U.S. Ser. No. 08/237,610 filed on May 3, 1994 now U.S. Pat. No. 5,590,691.

FIELD OF THE INVENTION

This invention relates to a multi-layer coated metal tube which are resistant to interaction with chemicals conveyed therethrough. More particularly this invention relates to a metal tube having an outer surface coated with a plurality of layers of plastic material securely bonded thereto and an inner lining which is chemically resistant.

BACKGROUND OF THE INVENTION

Metal pipes often have their outer surfaces covered with a protective coating. These pipes are used for conveying brake fluids, fuel and the like in a motor vehicle. As such, these pipe lines are located under the body of the vehicle. Since they are used in such a harsh environment, the pipes are required to have a high degree of corrosion resistance, scratch resistance, impact strength and mechanical wear resistance. In cold climates, it is not unusual to encounter rock salt sprinkled onto road surfaces in order to prevent freezing of water on the road surfaces and the inherent dangers caused thereby. The popularity of spreading rock salt has created a serious problem of pipe corrosion. The pipes are also vulnerable to damage or wear from stones or mud spattered by rotating wheels of the vehicle. It is, therefore, necessary that the pipes attached to the underbody of the vehicle be coated so as to resist both chemical corrosion and mechanical damage or wear.

A double-rolled steel pipe has been proposed that is made by rolling a steel strip or hoop twice and brazing its longitudinal edges by means of a copper plating layer, or a seam welded steel pipe, where the pipe has an outer surface coated with an electroplated zinc film. The zinc film has an outer surface coated with a relatively thick special chromate film having an olive color. The chromate film has an outer surface coated with a fluorinated resin film. The fluorinated resin film is formed by impregnating the chromate film with a dispersion of polyvinyl fluoride immediately after the formation of the chromate film when it is still in the state of a gel, and drying them under heat, so that the fluorinated resin film may form an intimate bond with the chromate film. When the chromate film is formed by treating the pipe with a solution, it requires large amounts of a chromium compound and an organic acid, such as formic acid, used as a reducing agent. It is necessary to supply the treating solution with the chromium compound frequently, and to renew it at regular intervals of time in order to maintain a constant film forming capacity. The waste solution, however, contains a large amount of chromium having a valence of 6, which is a toxic substance, and its disposal, therefore is very costly. Although the chromate film as formed is highly resistant to corrosion, the heat to which it is exposed during the formation of the resin film deprives it of water and thereby makes it brittle. Any plastic deformation of the pipe, such as the result of bending or double flaring, forms fine cracks in the chromate film which lowers its rustproofing properties.

It has also been proposed to provide a corrosion resistant pipe where a metal pipe is provided with an outer surface coated with a zinc film, a chromate film, an intermediate layer consisting sequentially of an epoxy resin, and a polyvinyl fluoride film formed one on top of another in the order listed. A plastic-coated steel tube has also been proposed where a steel tube has an inner layer of at least one cross-linked polyolefin modified with a hydrolyzable silane and an outer unmodified or soot-blended polyolefin layer on the exposed surface of the inner layer. A process for coating metal tubes with plastic material has also been disclosed where a fixed metal tube is heated to a temperature above the melting point of the plastic material to be employed, thereafter causing a mixture of plastic powder and air to pass through the metal tube whereby the plastic material is fritted onto the inside surface of the tube, thereafter rotating the metal tube and applying to the exterior surface thereof in a plurality of stages a plastic material, the plastic material being electrostatically sprayed onto the rotating metal tube and after each stage of electrostatically applying plastic to the outside surface of the metal tube and applying plastic material to the inside surface thereof, completely melting and smoothing the plastic material.

An automobile tube line for a brake, fuel or hydraulic system has also been disclosed with an interior steel tube having a galvanized exterior layer with an additional exterior olive chromated layer which is wrapped in an additional Nylon 12 layer casing where the plastic casing is a polyamide layer applied by extrusion on top of the olive chromated layer.

It is also important that the tubing stock material of choice be essentially non-reactive with the materials conveyed within. Various fluids conveyed through the tubing exhibit degrees of reactivity with interior tubing surfaces. For instance, the components of various alternate fuels for example methanol contained in fuels such as M85 and ethanol in fuels such as E85 can react with metals such as low carbon steel to cause corrosion. The resulting corrosion can weaken the tubing; eventually resulting in rupture, leakage and premature failure. Addition, even materials which are not directly corrosive in a metallic environment can render the metal susceptible to exterior galvanic corrosion. Thus, the useful life of conventional low carbon steel is shortened even when conveying only mildly reactive materials.

Reactivity between the tubing and the materials conveyed within it can also compromise the purity of the conveyed fluid materials. Because of this, inexpensive metal tubing cannot be used in a variety of applications where possible fluid contamination with metal complexes, liquids or the like are not acceptable. In such instances, it is necessary to subject the tubing to post-formation processes such as annealing or to resort to more expensive tubing made of non-reactive metals or to tubing made from polymeric materials.

Polymeric tubing has been suggested as a substitute for metal walled tubing in various instances to eliminate the problems such as those previously discussed. Unfortunately, polymeric tubing presents a different set of problems. Conventional polymeric tubing is generally composed of materials such vinyl, as polypropylene, polyvinyl chloride and the like. these polymers exhibit poor formability characteristics. Because the polymeric material exhibit elastic memory, the tubing constructed from such materials is difficult to permanently contour.

Prolonged use of sections of non-metal walled polymeric tubing can lead to the development of static charge. In this phenomenon, static charge builds up along the plastic line and, ultimately, results in numerous, unpredictable pinhole ruptures in the tubing. As can be appreciated, the use of polymeric lines is not desirable in high pressure applications or in situations in which the tubing will convey flammable liquids which could ignite upon escape during rupture. Furthermore, it is difficult to achieve burst strength characteristics in monolithic structures even if problems of static discharge can be obviated.

Even if problems of formability and static discharge can be overcome, non-metal walled polymeric tubing, exhibit extreme weakness to heat. The polymeric materials employed in conventional plastic tubing sag, weaken or melt at undesirably low temperatures; rendering them impractical for many applications such as use in conjunction with automobile engines.

Finally, polymeric materials which make up the non-metal walled tubing can interact with certain organic components causing softening, localized deformation of the tubing, or permeation of the organic material through the polymeric material. Thus, a variety of organic fluids cannot be conveyed through polymeric tubing stock.

The use of composite or lined tubing stock having an outer metal layer and an interior non-reactive polymeric layer has been proposed. However, to date, metal tubes having relatively wide inner diameters have been produced by spraying a liquid polymeric material onto the interior of the metal tube by means of an appropriate spray nozzle or other suitable dispensing device inserted into the interior of the metal tube to deliver molten polymeric material directly onto the interior wall. This method generally limits the production of such tubing to tubing stock having an inner diameter of sufficient width to permit insertion of the polymer dispensing device. Because the polymer applicator can only be inserted a relatively short distance into the metal tube, the overall length of lined tubing produced by this method is limited. Given these constraints, it can be appreciated that it has been impossible to employ the method to small-diameter tubing. Furthermore, it has been difficult to assure that the applied polymer plastic is uniformly dispersed over the interior surface of the tubing. Non-uniformities of the polymer deposited on the interior surface of the tubing can result in unwanted narrowing of inner diameter of the tubing causing constriction or blockage or insufficient polymer coating to prevent interaction with the reactive or corrosive fluids conveyed therethrough.

In co-pending application Ser. No. 08/260,523, filed on Jun. 16, 1994, there has been proposed a lined small diameter tubing and method of making the same which has a diameter less than about 1 inch with diameters between $3/16$ and $3/4$ inch being preferred. In this invention, the composite tube comprises a cylindrical outer metal conduit having an outer wall and an interiorly oriented wall which defines a central shaft extending longitudinally therethrough and an interior tube made of a suitable non-reactive material such as a polymeric material surrounded by and positioned within the cylindrical outer metal conduit. The outer wall surfaces of the interior tube matingly engages the interiorly oriented wall of the metal conduit and conforms to the interiorly oriented wall to protect the surface of the interiorly oriented metal wall from contact with potentially reactive fluids conveyed therethrough. The tubing described therein lacks an effective means to protect the exterior tube surface from environmental degradation and corrosion.

SUMMARY OF THE INVENTION

It is desirable in the present invention to provide brake lines and fuel lines, and other lines which could not be damaged by the regular use of an automobile, which can meet the continuous demand of traffic conditions, and therefore must have a long lasting durability of ten years or more. In such application areas, resistance to corrosion, resistance against breaking, cracking or bursting due to internal pressure, resistance to stone impact, a high corrosion resistance against winter salt and resistant to interaction with materials conveyed therethrough are all desirable characteristics. At this time, tube lines made of steel are currently being used in a large capacity. For brake lines, double-wrap steel tubes are suitable, whereas single wall straight bead welded steel pipes are more appropriate for fuel lines.

The extruded multiple plastic layer coating bonded to a metal tube and the process therefor according to the present invention provides numerous advantages over the prior known tubing configurations. In particular, the multiple layer allows greater selection of materials for meeting varying application and environmental conditions. The multiple layers allows the application of a coating on top of the basic corrosion resistant coating to act as a cushion thereby eliminating the necessity of assembling a protective sleeve or heatshrink tube to outside of the tube for stone impingement protection. The multi-layer coating according to the present invention also allows use of recycled materials in the inner layer, sometimes referred to as "regrind" materials in intermediate layers at a substantial-cost savings without detrimental loss of external coating properties or internal adhesion of the coatings to the external surface of the metal tube. The multi-layer configuration of the present invention also allows the use of less costly materials in the inner layers which may not have the chemical resistance required of the outer layer. The multi-layer configuration allows for alloying of the layers to improve the adhesion to the base metal tube. A multi-layer configuration, even if of the same material, greatly reduces the probability of apertures or perforations in any one layer reaching through to the base tube. The multi-layer configuration provides more precise control of the coating thickness and concentricity about the base tube. Finally, the multi-layer configuration according to the present invention allows for color selection with protection of the color layer below a clear top layer for protection from ultraviolet light, chemical and heat degradation.

The tube of the present invention also includes an interior tube made of a suitable non-reactive material surrounded by and positioned within the metal tube. The interior tube has outer and inner wall surfaces with the outer wall of the interior tube being matingly engaging the interiorly oriented wall of the metal tube in a suitable manner.

The interior tubing conforms to the interiorly oriented wall of the metal tubing to surround and define a hollow tubing conduit extending longitudinally through the composite tubing and to protect the surface of the interiorly oriented metal wall from contact with potentially reactive fluids conveyed therethrough.

The tube of the present invention includes a metal tube having an outer surface pretreated to form a surface selected from the group consisting of a zinc plate with chromate, a zinc plate with phosphate and chromate, a galvanized zinc layer with phosphate and chromate, a galvanized zinc layer with chromate, a zinc-metal blend with phosphate and chromate, and a zinc-metal blend with chromate, where the zinc-metal blend is selected from a group consisting of zinc-nickel alloy, zinc-cobalt alloy, and zinc-aluminum alloy, and mixtures thereof; an intermediate alloy or bonding layer applied to the pretreated outer surface of the metal tube which is a polymeric material selected from a group consisting of Nylon 12, Nylon 6, zinc chloride resistant Nylon 6, thermoplastic elastomers, fluoropolymers, and mixtures thereof, in combination with at least one of the group consisting of a thermoplastic elastomer, an ionic polymer, a polyamide, and mixtures thereof; and an external layer which is a polymeric material selected from a group consisting of a Nylon 12, zinc chloride resistant Nylon 6, thermoplastic elastomers, fluoropolymers, and mixtures thereof. In an alternate embodiment, the tube of the present invention consists of an internal steel conduit which has a zinc treatment layer, a chromatization layer overlaying the zinc layer and a polymeric coating located on the chromatization layer. The chromatization layer can be olive, yellow or transparent chromatization with olive being preferred as providing the highest resistance to corrosion. The polymeric material is preferably an extrudable polymeric material selected from the group consisting of Nylon 12, Nylon 6, zinc chloride resistant Nylon 6, thermoplastic elastomers, fluoropolymers and mixtures thereof. The metal tube in the alternate embodiment may either be double wall steel conduit or single wall side welded steel tubing.

As employed herein, the term "polymeric" is defined as polymolecular complexes formed by the union of simple organic monomers. The polymeric material employed can be a homopolymer, polymeric blend or copolymeric material.

The process of the present invention in one form includes the steps of positioning a length of tubing made of a suitable, non-reactive material within the interior of a metal tube, the metal tube, preferably having an inner diameter greater than the outer diameter of the tubing made of non-reactive material and progressively reducing the diameter of the metal tube after the non-reactive tube has been positioned therein to produce a tube having an outer diameter essentially equal to the outer diameter of the non-reactive tubing. The process also includes the step of extruding multiple layers of polymeric material onto the outer surface of the metal tube and bonding the polymeric material thereto. The process of the present invention also includes the steps of pretreating the metal tube having an initial inner diameter to remove oxides and to improve the metal surface for subsequent treating, applying a metal layer to the pretreated metal surface where the metal layer has as a major constituent zinc, applying at least one sealing surface treatment selected from the group consisting of a phosphate surface treatment, a zinc-aluminum alloy surface treatment and a chromate surface treatment on top of the metal layer. In preparing the tube of the alternate embodiment, the process includes the steps of pretreating the external surface of the metal tube, preferably by imparting a zinc layer and an overlying chromate layer, and heating the pre-treated tube to a temperature which conforms to the temperature at which the polymeric material is applied to the metal tube and applying the polymeric material to the pretreated exterior surface of the metal tube.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED AND ALTERNATIVE EMBODIMENTS

Figure 1:
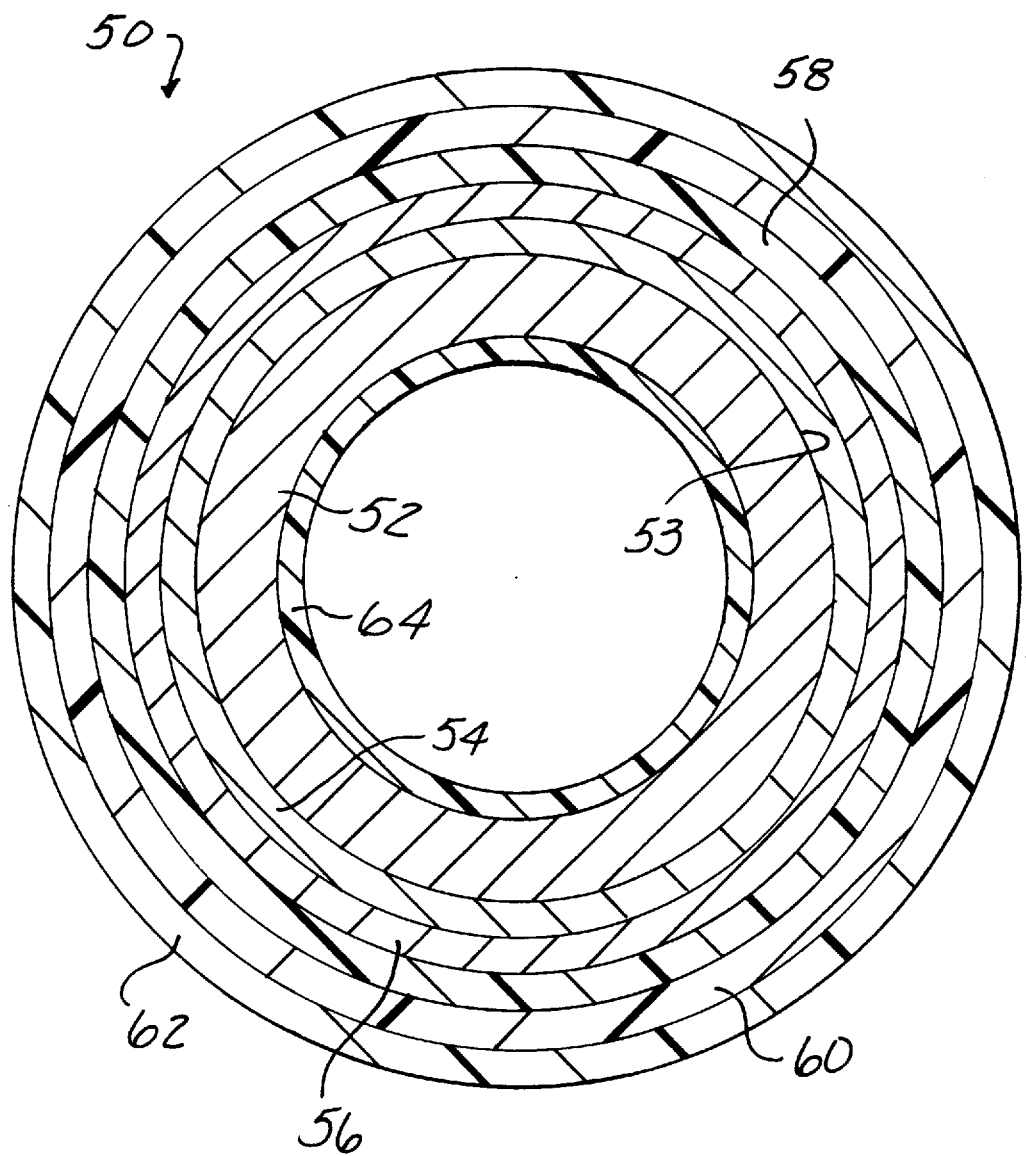
FIG. 1 is a cross-sectional view of a tube according to the present invention with the layer thicknesses exaggerated for purposes of illustration.

The present invention is a composite tube which has an interior surface resistant to interaction or reaction with the materials which are conveyed therethrough. The reactive materials can include various organic fluids such as short-chain alcohols, petroleum fuels containing reactive additives as in the case of alternative fuels, as well as various materials known to be corrosive to metal tubing such as those employed in desalinization units or the like. Other similar reactive and non-reactive fluids can be successfully conveyed through composite metal tubing of the present invention.

The tubing of the first embodiment of the present invention comprises a cylindrical outer metal conduit having an outer wall, an interiorly oriented wall which defines a central shaft extending longitudinally therethrough, and a continuous interior tube made of a suitable non-reactive material surrounded by and positioned within the cylindrical outer metal conduit. The continuous interior tube has an outer wall surface and an inner wall surface. The outer wall surface of the interior non-reactive tubing contacts the interiorly oriented wall surface of the metal conduit to provide mating engagement between the two concentrically disposed tubes in a manner which is essentially uniform throughout the length and circumference of the composite tubing.

The cylindrical outer metal tube may be made from any metal or metal alloy or other metallic, organometallic or metal matrix composite material which can be suitably formed, bent, or machined for subsequent fluid conveying operations. These materials include but are not limited to materials which are reactive with various chemicals or chemical constituents conveyed therethrough or are susceptible to galvanic or chemical corrosion. The outer metal conduit is preferably made of a suitably formable and weldable material, with a metal selected from the group consisting of ferritic metals, non-ferritic metals, and alloys thereof being preferred. In situations requiring tube ease of formability and economy, low carbon steel is preferred. Various grades of low carbon steel can be successfully employed in the composite tubing of the present invention. Specifics of steel type vary depending upon end use application but could readily be discerned by one skilled in the art. It is to be understood that metals other than low carbon steel can be employed if desired; for example aluminum, stainless steel and the like provided that the metal tube employed be resistant to wear and tear and provide protection against breakage, tearing and bursting which can result from internal pressure and to provide protection against road hazards such as rocks and deicing salt. The current practice favors the use of metal tubes made of steel.

The metal tube employed can be either double-walled or single-walled depending on the intended end use of the tube and the method of manufacture employed according to the present invention. For instance, in current manufacturing practice, double-wall tubes are considered particularly suited for applications such as brake cables, fuel lines and the like. Single-wall side welded tube can be employed for purposes such as fuel lines. As will be appreciated upon review of this specification and the accompanying claims, the use of double-wall or single-wall tube can be influenced by the particular manufacturing process employed to obtain tube according to the preferred or alternate embodiment both of which will be described in greater detail subsequently.

The cylindrical outer metal tube may have a finished outer diameter of any size desired for the given end use application. The outer diameter of the tube of the present invention is, preferably less than but restricted to about ¾ inch with an outer diameter between 3/16 inch and ¾ inch being preferred. The wall thickness of the cylindrical outer metal tube is dependant on the end use application for the composite tubing as well as the drawing and welding operations employed in the tube formation process. In general, the outer metal conduit comprises up to about 99% of the total wall thickness of the composite tube of the present invention prior to application of multiple polymer layers to the exterior surface with wall thicknesses of the outer conduit between about 40 and about 99% being preferred. The thickness of the walls of the outer metal conduit may be less than about 0.3 inch; with thicknesses between about 0.01 inch and about 0.1 inch being common and thicknesses between about 0.02 inch and about 0.05 inch being preferred. It is to be understood that the wall thickness of the outer metal conduit can be varied according to the requirements for the particular application of metal tubing.

The composite metal tube of the present invention also includes continuous interior tube grade of a suitable non-reactive material having an outer wall surface in contact with the interiorly oriented wall of the cylindrical outer metal conduit to provide essentially uniform mating engagement between the two concentrically disposed tubes. The interior tube conforms to the interiorly oriented wall of the outer metal conduit. The inner wall surface defines a hollow central tubing conduit extending longitudinally through the length of the tubing.

The interior tube may be constructed from any suitable material which is non-reactive in the particular application for which the tubing is to be employed. The material may be either metal or polymeric as desired and required.

The non-reactive material employed may be any polymeric material suitable for formation of lengths interior tubing which is non-reactive with materials to be conveyed therein. The polymeric material employed in the interior tube may be any homopolymer, polymeric blend or copolymeric material which is substantially non-reactive in the presence of the chemicals or compounds to be conveyed through the tubing. In particular, the polymeric material employed in the interior tube is substantially non-reactive in the presence of short chain alcohols, various corrosive agents, metal oxidizers, and the like.

The polymeric material of choice for the interior tube is a thermoplastic material exhibiting thermal stability at temperatures of approximately 500° F. The material employed is preferably extrudable as either a monoaxially or biaxially oriented organic film. In the preferred embodiment, the material is capable of extrusion to thicknesses less than about 0.02 inch with extrusions to thicknesses less than about 0.005 inch being preferred. In the preferred embodiment, the polymeric materials is selected from the group consisting of polyamide resins, polytetrafluoroethylene resins, and mixtures thereof. Examples of suitable polyamide resins for use in the present invention include the nylons. Examples of suitable polytetrafluoroethylene resins include those having the trade designation TEFLON.

The non-reactive material employed in the composite tubing of the present invention has a wall thickness sufficient to isolate the interiorly oriented wall surface of the outer metal conduit from any harmful effects of any fluid conveyed therethrough. The thickness of the non-reactive liner is sufficient to maintain the integrity of the interior tubing without unduly compromising the heat exchange capability of the composite tubing.

The interior non-reactive tube is positioned within the cylindrical outer metal conduit so as to engage its interiorly oriented wall in an essentially uniform manner such that the central shaft is completely defined by and surrounded by non-reactive material throughout its longitudinal length.

The engagement between interior tubing and the outer metal conduit may be any suitable mechanical, chemical or a mixture of mechanical and chemical attachment properties. The term "mechanical attachment" is defined herein to encompass physical engagement between the two concentrically disposed tubes which includes but is not limited to interference fits and other frictional and/or compressive engagements. The term "chemical attachment" is defined herein to include any chemical or electrochemical bonding which may occur between the two concentrically disposed tubes. "Mixtures of mechanical and chemical attachment properties" is defined herein to include attachment phenomena such as adhesion. In the preferred embodiment, the engagement between the two concentrically disposed tubes is an interference fit.

The metal tube of the first embodiment of the present invention can be formed by a process in which a length of interior tube non-reactive material having a predetermined outer diameter is positioned within the inner diameter of metal tubing of a suitably analogous length. The non-reactive material is, preferably, polymeric. The predetermined outer diameter of the polymeric tube preferably is essentially equal to the desired outer diameter of the finished composite tubing. The metal tube has an initial inner diameter greater than the outer diameter of the non-reactive polymeric tube. Once the non-reactive polymeric interior tube is in position, the external metal tube can be reduced in size by suitable forming and drawing operations to an outer diameter essentially equal to the predetermined outer diameter of the non-reactive interior tubing.

In the process of the first embodiment of the present invention, at the outset of processing, the metal tube is preferably single-wall tube having an unsealed side seam extending along the length of the tube through which the polymeric tubing can be inserted. The metal tube is sealed after insertion of the polymeric tube by any suitable sealing means such as an electrical resistance welding. Once sealed, the metal tube can be drawn and formed to reduce the tubing diameter until it snugly engages the polymeric tubing contained therein to provide concentric orientation of the two tube materials, one within the other.

For a more complete understanding of the method of making the composite tube of the present invention, attention is directed to the schematic depiction of the method of the present invention as set forth in FIGS. 1 and 2 and discussed as follows.

The cylindrical outer metal conduit may be previously formed and provided from existing stock into which the non-reactive tubing can be inserted. In the preferred embodiment, the conduit is gradually formed from suitable flat sheet metal stock.

The flat sheet metal stock may be maintained in any manner which will permits its uniform conveyance into and through various tube forming stations. As illustrated in FIG. 1, a continuous portion of flat sheet metal stock 12 maintained on a suitable pay-out reel 14 is paid out from the reel 14 and drawn into tube forming machinery 10 where the sheet metal stock 12 is oriented, sized and operated on by a plurality of forming rolls 16 to progressively form the flat sheet stock into a continuous unsealed metal tube.

As can be appreciated by one skilled in the art, in the initial forming operations the sheet metal stock 12 passes in contact with convex rollers 16A which form the interior and exterior of the tubing surface. The sheet metal stock 12, then, comes into contact with concave rollers 16B which operate only on the exterior surface of the tubing being formed to bring the two side edges into abutment. The exterior sections bringing the two longitudinal edges of the sheet metal stock 12 into sufficiently close proximity or abutment with one another to permit subsequent sealing along the seam is thus formed.

The interior non-reactive tube to be employed, i.e. polymeric tube may be brought into contact with the metal sheet stock 12 at any time before during or after the initial roller forming operations. In the preferred embodiment, continuous polymeric tubing 18 is introduced into relationship with the metal sheet stock 12 during roller forming operations.

The continuous polymeric tube 18 is preferably positioned in the metal tube in formation during or immediately subsequent to the interior/exterior formation passes implemented by convex rollers 16A. It is preferred that the continuous polymeric tube 18 enter the metal tube at a point in the interior/exterior forming process where enough curvature has been imparted to the sheet metal stock 12 to assist in maintaining the polymeric tube 18 is position relative thereto. In the preferred embodiment the polymeric tubing is brought into contact with the sheet metal stock 12 immediately prior to the commencement of external forming operations performed as the sheet metal stock passes through concave rollers 16B.

In the process of the present invention, the metal sheet stock 12 is paid off of the payoff 14 and fed to the forming rollers 16 first rate ($R_1$). The first rate $R_1$ is sufficient to permit appropriate formation of the sheet metal stock into unsealed tubing as well as permitting sealing of the tubing stock in subsequent steps. While the first rate $R_1$ can be varied, it is generally desirable to maintain a first rate $R_1$ as high as possible to maximize tubing production. For this reason, feed rates between about 150 and about 180 feet per minute are preferred but speeds up to 250–450 feet per minute can be envisioned.

In the process of the present invention, the polymeric tubing is preferably introduced into the metal tubing at any point prior to the welding step. In the preferred embodiment, the polymeric tubing is introduced into the metal tubing immediately prior to external metal tube forming operations performed by external rollers 16B. The rate of introduction or payout of the polymeric tube 18 into the metal tube is greater than the payout rate of the sheet metal stock that forms the surrounding outer metal tube. The differential in payout rates causes the polymeric tube 18 to more rapidly pass through the tube sealing zone and to be maintained in an appropriately taut manner through final forming and drawing steps.

In metal tube forming processes such as that of the present invention, the sealed metal tubing is subjected to post-sealing sizing and drawing operations during which the outer diameter of the sealed metal tube is reduced with concurrent elongation of the tubing stock. Thus, the finished product passes from the final forming station 28 at a rate ($R_2$) faster than the payout rate of the unformed sheet metal stock 12 from reel 14. The increase in speed is proportionally related to the decrease in diameter in the finished product.

In the preferred embodiment of the process of the present invention, the polymeric tube 18 is paid out into the partially formed metal tubing at a rate approximately equal to the production rate of the finished composite tube.

The speed differential between the polymeric tube 18 and the outer metal conduit upon introduction of the tubing is a function of the diameter reduction of the outer metal tubing to be accomplished during the final sizing and forming operations. Preferably, the outer diameter of the outer metal tubing is reduced to a diameter approximately equal to or slightly less than the outer diameter of the polymeric tubing contained therein by progressive contact with sizing rollers 28A and 28B which will be described in detail subsequently. In the preferred embodiment the polymeric tube 18 is introduced at a rate equal to the rate finished composite tubing passes from the final forming station 28.

The polymeric tube 18 employed in the process of the present invention has an outer diameter which is approximately 30 to about 70% of the outer diameter of the unsealed metal tubing formed by rollers 16. The payout differential between the two materials is approximately equal to this diameter differential. The diameter of the polymeric tubing 18 is less than about 1 inch with diameters between about 3/16 inch and about 3/4 inch being preferred.

The polymeric tube 18 employed herein may have any suitable wall thickness. The wall thickness may be limited by the tensile strength of the chosen polymeric material during tube formation. In the preferred embodiment, polymeric wall thicknesses between about 0.005 inch and about 0.01 inch are employed.

The polymeric tube 18 may be made of any suitable thermally stable thermoplastic material. Materials having thermal stability of approximately 500° F. are preferred. The thermoplastic material employed exhibits suitable tensile strength and is unreactive with a variety of chemical materials. As indicated previously, the polymeric tube 18 preferably consists of a polymer selected from the group consisting of polyamide resins, polytetrafluoroethylene resins, and mixtures thereof.

The polymeric tube 18 may be produced by any process which provides an adequate supply of tubing stock for the formation process of the present invention. The polymeric tube 18 may be extruded concurrent with the tube forming process. In such conformation processes, the sheet metal stock payout rate would be modified to provide a final tube production rate compatible with the tubing extrusion rate. Alternately, the polymeric tube 18 formed in separate process can be coiled onto a separate polymeric tubing payout reel 30 to permit flexibility in adjusting the rate of tube formation.

The polymeric tube 18 is paid out into the partially formed metal tube at a point adjacent to but immediately upstream of gas injection pipe 22. As shown in FIG. 1, gas injection pipe 22 is inserted into the partially formed metal tubing immediately before the first external forming operation at roller 16B. The gas injection pipe 22 extends through the interior of the metal tubing being formed and terminates proximate to and slightly downstream of the tube sealing means 20 to provide cooling and oxidization protection of the sealed metal tubing by directing an inert gas such as nitrogen at the newly sealed seam.

The gas injection pipe 22, preferably, has a cross-sectional contour capable of directing and orienting the polymeric tube 18 in position in the outer metal tubing, the gas injection pipe 22 preferably has a concave divot 23 extending longitudinally along the pipe 22 which can contact the polymeric tubing passing thereby. The gas injection pipe 22 is interposed between the polymeric tubing 18 and the side edges of the sheet metal stock 12 being brought into abutment through the process of the present invention. This insures proper radial positioning of the inner tube during sealing procedures.

After the tube formation stage, the unsealed metal tubing with the polymeric tube 18 contained therein is sealed by any suitable procedure. The sealing procedure preferably provides a sealed seam having a narrow width; i.e. between about 0.01 and about 0.1 inch. The narrow seam seal occurs in a manner such that any given region of the seam and adjacent metal tube area remains at temperature for an interval less than about 0.5 to 1.5 seconds. Rapid heat dissipation can be augmented further by post sealing gas cooling, water cooling or a combination of both if desired.

Sealing is preferably effected by localized welding. In the preferred embodiment, electric resistance welding is employed. As shown in FIG. 1 the unsealed seam is brought into contact with suitable welding electrodes 24, 24' held in place by an appropriate pressure roll 26. In the preferred embodiment, a 20° arc is employed. The tubing passes by the welding source 20 at a rate capable of providing a suitable uniform weld.

The sealed metal tube can then be subjected to post welding steps such as exterior weld metal scarfing and integrity assurance testing (not shown). Once sealed, the sealed metal tube with the smaller diameter polymeric tubing contained inside can pass to the drawing and forming section 28 where diameter reduction of the outer metal conduit can be accomplished. The drawing and forming section 28 consists of a plurality of powered reducing rollers 28A and idle rollers 28B which both convey the outer metal tubing onward and progressively reduce the outer diameter of the sealed metal tube. The amount of diameter reduction is that sufficient to achieve an interference fit between the outer metal tube and the polymer tube contained inside. In the preferred embodiment, diameter reduction up to and including 50% with complimentary increases in the payout rate of the formed, sealed reduced-diameter metal tube are obtained.

While the exterior metal tube is conveyed by powered reducing rollers 28A, in the preferred embodiment, the polymeric tube 18 is drawn by its leading edge which is in interfering engagement with the outer metal tube. Thus the polymeric tube 18 is drawn into the metal tube being formed at a rate essentially equal to the finish rate of the sealed metal tube ($R_2$). The polymeric tube 18 payout means is appropriately configured to provide suitable tension throughout the polymeric tube 18.

In the method of the present invention, the opportunity for thermal degradation of the polymeric tube 18 is greatly reduced because of the accelerated feed rate of the polymeric tube 18 past the weld source. Additionally, the radial positioning of the polymeric tube 18 away from the heat source prevents damage during the sealing process. Finally, the interposition of the gas injection pipe between the polymeric tubing and the weld spot further insulates and protects the polymeric tubing from thermal degradation.

Once the outer tubing has been roller reduced and the interference fit between the polymeric tubing and the outer metal tubing has been obtained, the composite tubing may be cut to length, formed, machined or coiled and stored as required. The need for subsequent tube treatment processes such as an annealing is eliminated.

The process outlined may also be employed using other non-reactive inner tubes. Alternately, the composite tube of the present invention may be produced by a draw die method in which the inner non-reactive tubing of the approximate desired finished diameter is inserted into a preformed outer tubing having an inner diameter greater than the outer diameter of the inner tube. The two distinct tubes are pulled from the output end of the tube forming mechanism. The diameter of the outer tube is progressively reduced to mating contact with the inner tube by passage through suitable die sets.

Exterior or surface corrosion can be minimized by various methods, for example, by the use of a coating of protective metal such as zinc, tin, lead, nickel or copper; by the production of oxide, phosphate or similar coatings particularly on iron and steel surfaces; by the application of protective paints; and by rendering the surface of the metal passive. Galvanizing zinc is applied to metal surfaces by dipping into a bath of molten zinc, by electrodeposition, or by metal spraying.

In the hot process, after being thoroughly cleaned, the articles are dipped into a bath of molten zinc. The bath must be maintained at a temperature somewhat higher than the melting point of zinc. The portion of the zinc surface through which the material to be coated enters the zinc bath is kept covered with a flux; ammonium chloride and zinc chloride are widely used for this. The process is used almost exclusively for sheet, pipe and wire. One or two percent tin is often added in the coating of sheets in order to obtain a very uniform coating and to improve the surface appearance. A coating applied by hot dipping never consists of a simple layer of zinc. It is always of a composite nature, the layer adjacent to the base metal consisting of zinc-iron alloys. This layer is relatively brittle and, thereby, imposes some limitations on hot-dipped galvanized materials for certain uses. A coating of 1 oz/ft$^2$ (305 g/m$^2$) of exposed surface is considered very suitable for most conditions of service.

The electrolytic or cold process consists in setting up the articles to be coated as cathodes and an electrolytic bath of soluble zinc salts, the anode being metallic zinc. The article to be coated being connected to the cathode of the system. Both the acid sulfate and the cyanide bath are used. The high ductility of the pure zinc coating obtained is the outstanding feature of such a coating. The ease of control of the uniformity and thickness is also advantageous.

A phosphate coating, in itself, forms only a very slight degree of protection against corrosion. Coatings of this kind are not suitable for severe outdoor service. Phosphating a steel surface is an excellent method of priming prior to subsequent painting or lacquering. The phosphate can be electrolytically applied, or can be applied by spraying. The phosphate treatment is also applicable to zinc surfaces.

The multi-layer tubing 50 according to the present invention includes a metal tube or pipe 52. The metal tube 52 may be welded steel tube, brazed steel tube, aluminum, copper or stainless steel. The process of the present invention is capable of applying a multi-layer coating over any rigid or semi-rigid tubular material in which a length of non-reactive, preferably polymeric tubing has been positioned. Of particular interest in the present invention, is the mechanical durability and corrosion resistance advantage obtained with carbon steel in either a welded single wall or brazed double wall form of tube or piping. Application of multi-layer coatings on other materials may be of a decorative nature with some protection also being obtained, for example improved chemical resistance of the outer shell of the multi-layer coating over the underlying rigid or semi-rigid tubular material.

Figure 3:
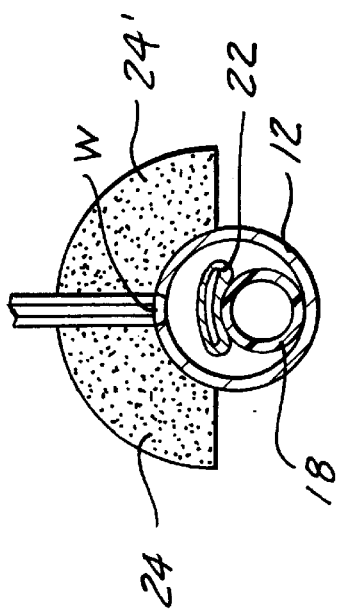
FIG. 3 is a detail drawing in cross-section taken at the welding station along the 2—2 line of FIG. 2.

Referring now to FIG. 3, the exterior surface of the metal tubing 52 is pretreated as required through various clean and rinse stages 100. In addition, the pretreating of the metal surface may also include pickling to remove oxides and to improve the metal surface for deposition of a metal based coating, such as a zinc based coating that is applied by hot dip galvanization, sometimes referred to as the "hot process" as previously described, or the preferred method of electrolytic bath coating or plating sometimes referred to as the "electrolytic or cold process" as previously described. In the alternative, previously pretreated metal tubing 52 may be supplied to the zinc based coating process step 102 according to the present invention, or a previously zinc base coated metal tubing 52 may be supplied to the surface treating step 104 of the process according to the present invention. In either case, metal tubing 52 with a zinc based coating applied thereon in a range of 0.4 to 1.0 ml is either produced or supplied for subsequent treating as will be disclosed hereinafter according to the present invention.

The external surface of the zinc based coating is treated to seal the zinc based coating to prolong its corrosion resistance and to provide a suitable surface for application of and bonding to extruded multiple layers of plastic to be subsequently supplied. The surface treatment of the zinc based coating is at least one of the surface sealing treatments selected from the group of a phosphate coating, a chromate coating including the clear, yellow and green versions, a zinc-aluminum alloy coating, and combinations thereof. A suitable zinc-aluminum alloy and coating is described in U.S. Pat. No. 4,448,748 which is incorporated herein by reference, and ASTM Designation: B750-88 provides a standard specification for zinc-5% aluminum-mischmetal alloy in ingot form hot-dip coatings, which is also incorporated herein by reference. Metal tubing pretreatment prior to plastic application can include combinations such as zinc-aluminum alloy with a phosphate coating and a chromate coating, zinc plate with a chromate coating, zinc plate with a phosphate coating and a chromate coating, galvanized zinc with a phosphate coating and/or a chromate coating, zinc-nickel alloy plate with a phosphate coating and/or a chromate coating, zinc-cobalt alloy with a phosphate coating and/or a chromate coating, a chromate coating of the clear, yellow and green versions, and combinations thereof. The pretreatment of the metal surface prior to the zinc base coating can include sand, shot or bead blasting, or other means of abrading the surface to roughen it, or detergent cleaning with rinse and acid pickling followed by a rinse. Any suitable surface abrading or etching process, either chemical or mechanical, may be used as a pretreatment prior to any other surface treatment and/or prior to extruding plastic onto the metal surface. The chromate coating can be applied as a wash having essentially no remaining weight. The zinc-aluminum alloy coating can be applied with a weight selected in a range of between 36 to 95 g/m$^2$ inclusive, and with a preferred weight range of between 75 to 80 g/m$^2$ inclusive and a most preferred weight of 78 g/m$^2$. The phosphate coating can be applied with a weight in the range of between 120 to 250 mg/ft$^2$ (1.292 to 2.691 g/m$^2$) inclusive. The zinc based coating on the metal surface is preferably a weight in the range of between 13 to 35 microns inclusive.

Various combinations of multi-layer tubing 50 according to the present invention can be prepared with metal tube 52 having a 3/16 inch diameter brazed tube, or 5/16 inch and 3/8 inch diameter welded steel tube. The process according to the present invention is not size dependent, and therefore it is anticipated that other sizes, including smaller sizes and larger sizes, of metal tube 10 can be processed according to the present invention.

The zinc-aluminum galvanizing alloy or coating preferably contains from about 85% to 97% zinc, from about 4% to 15% aluminum and at least about 5 ppm mischmetal (a variety of known rare earth containing alloys).

After treating the surface of the zinc based coating or layer 54 with the surface treatment layer 56, multiple plastic layers are extruded on the treated surface 56 of the zinc based layer 54 in step 106. In the alternative, multiple plastic layers can be extruded on to the external surface of the metal tube 52 without pretreatment. In either case, the multiple plastic layers preferably include at least an alloy or bonding layer, referred to herein as a first layer 58 formed on top of the treated surface layer 56 and an external shell or second layer 62 exposed to the outside environment. An optional intermediate or third layer 60 may be provided between the first layer 18 and the second layer 22 and may include one or more sublayers of plastic materials. Prior to extruding the multiple plastic layers onto the treated surface 56, the metal tube 52 is preheated to temperatures in the range of between 177° C. to 232° C. (350° F. to 450° F.) inclusive, with a preferred range of between 204° C. to 232° C. (400° F. to 450° F.) inclusive. The multiple layers of extruded plastic form a coating over the treated surface 56 with an overall thickness in a range of between 75 to 300 microns (3 to 12 mils), with a preferred range of between 125 to 250 microns (5 to 10 mils). Individual plastic layers can be applied with a thickness in a range of between 10 to 250 microns (0.3 to 10 mils) inclusive, with a preferred range of between 125 to 250 microns (5 to 10 mils) inclusive.

Figure 4:
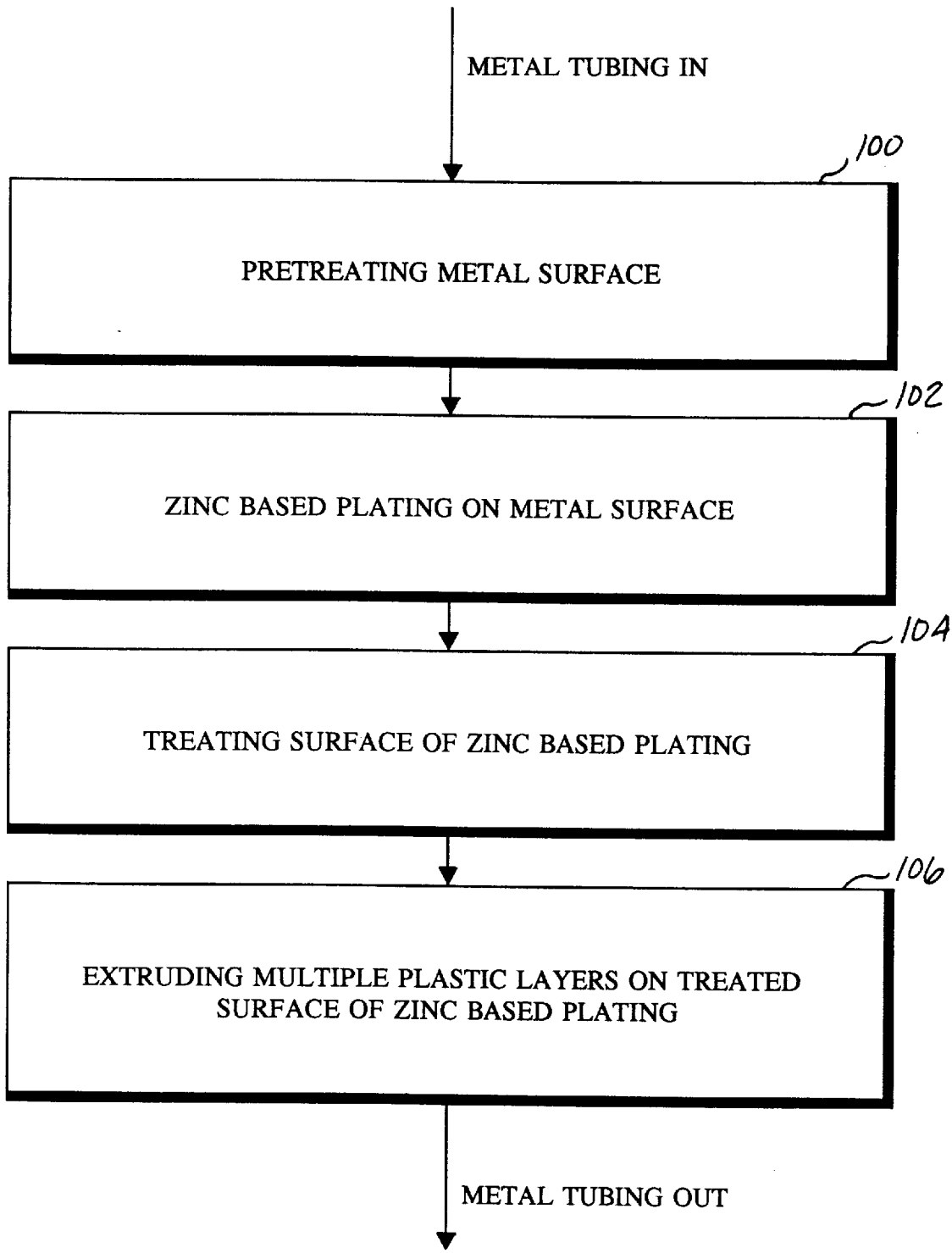
FIG. 4 is a simplified flow diagram of a process according to the present invention for extruding multiple plastic layer coatings bonded to a metal tube.

Referring now to FIG. 4, a more detailed flow diagram of a process according to the present invention is depicted. The tubing 52 as previously described is subjected to a clean and rinse step 108 followed by a pickling process step 110 to remove oxides and to improve the external metal surface for subsequent flash plating. After the pickling step 110, the metal tubing 52 is subjected to a rinse step 112. The electroflux and flash plate with zinc step 114 then applies the zinc based layer of a thickness in the range of 0.4 to 1.0 mil inclusive. A zinc-aluminum alloy coating is then applied to the external surface of the zinc based layer. A suitable zinc-alloy coating is commercially available under the tradename GALFAN from Eastern Alloys, Inc. of Maybrook, N.Y. The sealing step 116, of applying CALFAN while controlling the thickness in a range of 36 to 95 g/m$^2$ with a most preferred thickness of 78 g/m$^2$, is followed by a water quench step 118 to bring the tubing 12 back to ambient temperature, followed by a rinse step 120. It is to be understood that any of the quenching steps as discussed herein may be performed using any suitable material or process. Step 122 provides for a phosphate surface to be applied to the external surface of the GALFAN coating for improved adhesion of subsequent layers. A rinse step 124 follows the phosphating step 122. The application of a chromate coating occurs in step 126 to seal the phosphate surface applied in step 122. The phosphate surface is preferably applied with a thickness in the range of 120 to 250 mg/ft$^2$ (1.292 to 2.691 g/m$^2$), while the chromate coating may be applied as a wash having essentially no remaining weight on the tubing upon completion.

After the chromate wash step 126, the multiple layers of plastic are extruded onto the metal tubing 52 in step 128. Preferably, the tubing has been heated in a range of between 375° to 450° F. inclusive with a preferred temperature of 425° F. prior to the application of the multiple layers of plastic in step 128. A conventional mechanical applicator or extrusion head is used for coextruding the multiple layers of plastic simultaneously onto the surface of the preheated metal tube 52. In the preferred configuration, vacuum is applied to the head of the applicator to pull the plastic material down onto the surface of the preheated tube 52. The vacuum applied is preferably in the range of 1 inch to 22 inches of water (where 28 inches of water is equal to atmospheric pressure), with a preferred vacuum pressure of 10 inches of water. After extrusion of the multiple layers of plastic in step 128, the tubing 52 is subjected to a quench in step 130, which can be a water quench, oil quench or other material quench as required, and is thereafter coiled or cut to finished length in step 132.

In lieu of coextrusion, the process could also be carried out as a cross-head application wherein the layers are applied synchronously instead of simultaneously. However, this process is not as preferred as the coextrusion, in that there is a greater likelihood of loss of bonding efficiency and bonding properties, and there tends to be less control over layer thicknesses.

Figure 5:
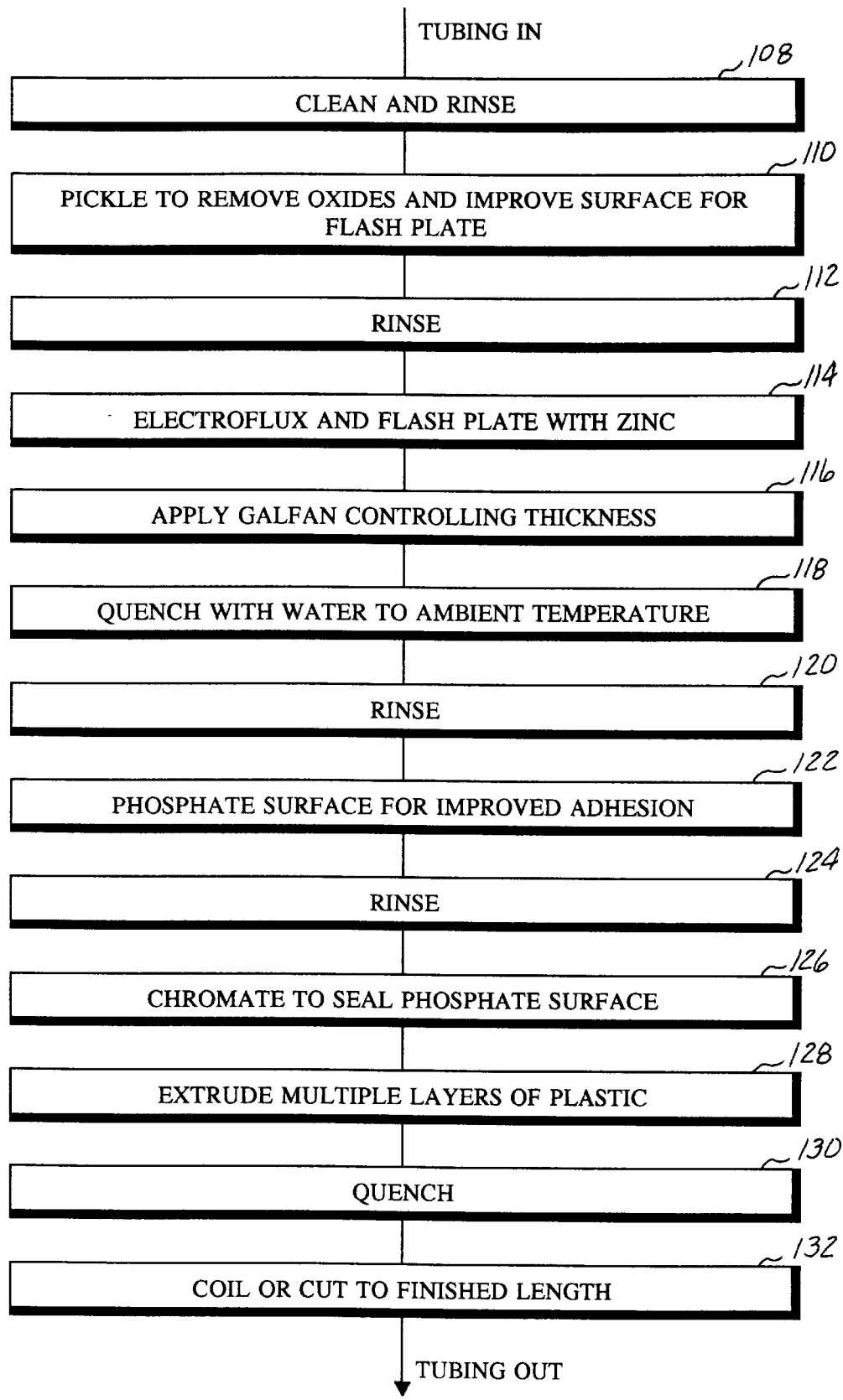
FIG. 5 is a second flow diagram of the process according to the present invention.
Figure 6:
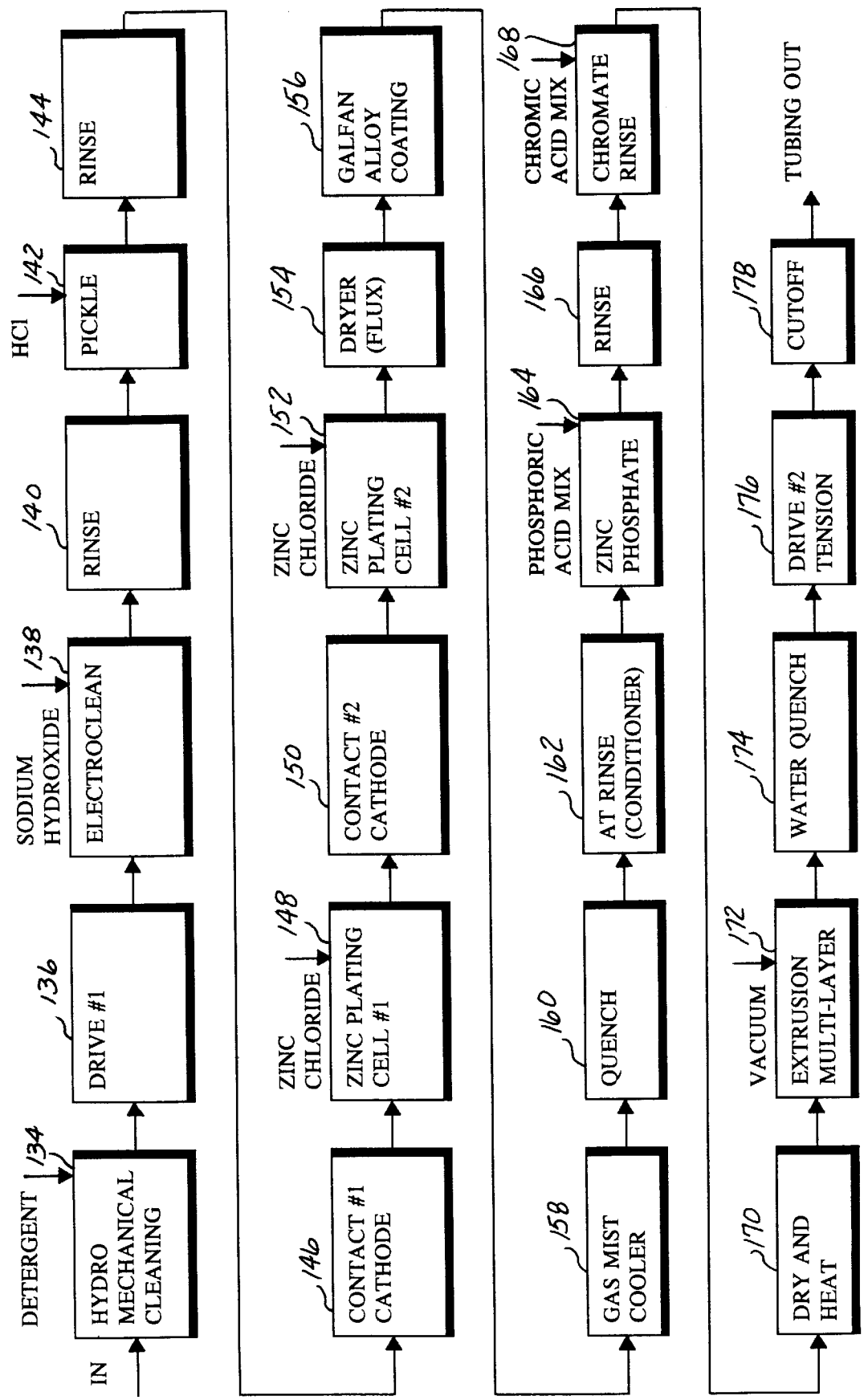
FIG. 6 is a detailed flow diagram of a process according to the present invention.

Referring now to FIG. 5, a detailed flow diagram of a process according to the present invention is disclosed. In step 134, the tubing is subjected to a hydro-mechanical cleaning with detergent additive. In step 136, the tubing is driven by a first drive unit in a continuous process through the following steps described below. The metal tubing 52 is driven through step 138 which includes an electro-cleaning process using sodium hydroxide. After the electro-cleaning process in step 138, the metal tubing 52 passes through a rinse step 140. A pickling step 142 using hydrochloric acid is followed by another rinse step 144. The tubing engages contact #1 cathode at step 146 and passes through a zinc chloride bath at zinc plating cell #1 in step 148. Thereafter, the metal tubing 52 engages contact #2 cathode at step 150 and passes through a zinc chloride bath and zinc plating cell #2 at step 152. At step 154, the metal tubing 52 is subjected to drying, where flux may be applied if appropriate. A zinc-alloy coating is applied in step 156. As previously described, a suitable zinc-alloy coating is available under the tradename GALFAN from Eastern Alloys, Inc. located in Maybrook, N.Y.

The metal tubing 52 then passes through a gas mist cooler at step 158, followed by a quench at step 160 and rinse with conditioner at step 162. The metal tubing then passes through a phosphoric acid mix where a zinc phosphate coating is applied at step 164 followed by a rinse at step 166. Thereafter, the metal tubing 52 passes through a chromic acid mix where a chromate rinse at step 168 seals the phosphate layer followed by drying and heating at step 170. After heating to the desired temperature range, the metal tubing 52 passes through an extrusion head for application of multiple plastic layers to the outer chromate sealing surface in step 172. Preferably, the vacuum is applied to the extrusion head in order to draw the plastic down into intimate contact with the chromate surface. Suitable plastic materials for the multiple layers applied to the metal tubing 52 are described in greater detail herein below. Following the extrusion process step 172, the multi-layer tubing 10 is subjected to a water quench at 174 followed by passing through drive #2 which places the tubing in tension at step 176 followed finally by a cutoff step 178 where the tubing is cut to the appropriate length or coiled as desired.

Figure 2:
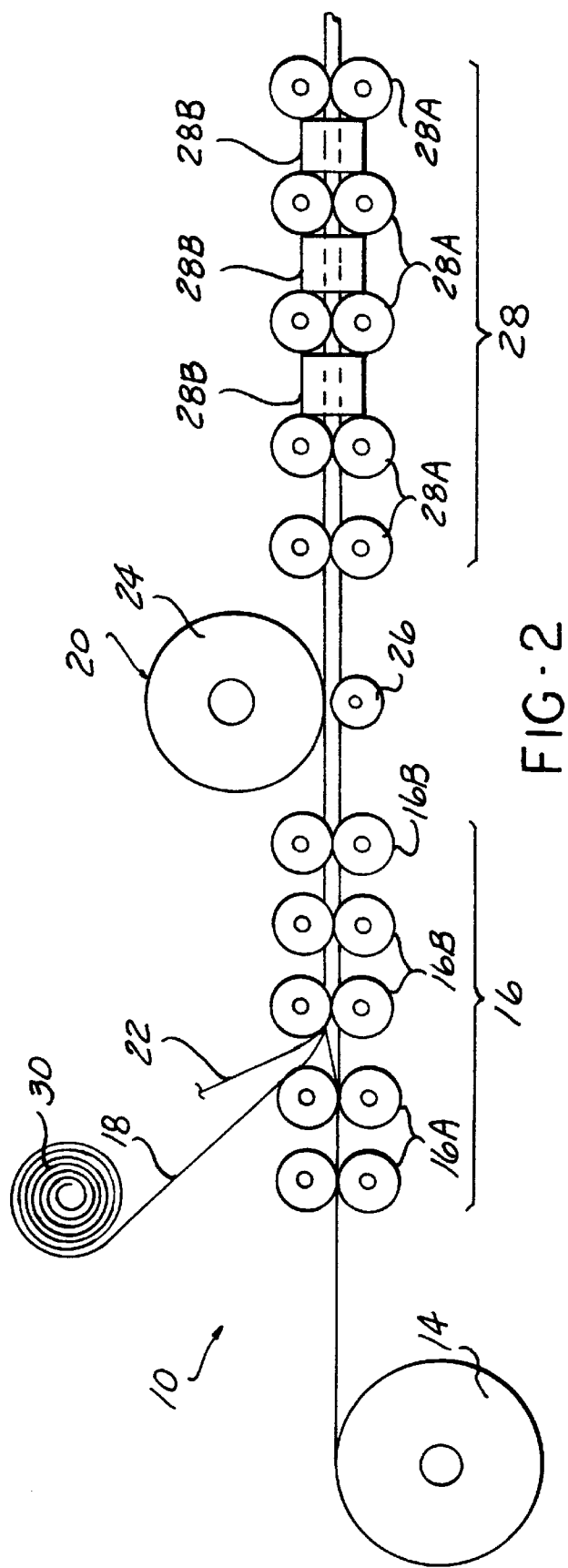
FIG. 2 is a schematic drawing of one preferred method of positioning a non-reactive inner tube within a metal tube during a tube forming process.

Referring now to FIG. 1, the multi-layer tube of the present invention is designated generally as 50. Multi-layer tube 50 comprises a tube or pipe 52 having an outer surface 53. Tube 52 may be formed in any conventional manner and of any suitable material. For example, tube 52 may be a welded single wall steel tube, a brazed double wall steel tube, etc. Further, aluminum, stainless steel and the like also may be used. Yet still further, tube 52 may be formed from any rigid or semi-rigid tubular material. Tube 52 may be of circular cross section as shown, however, it is to be understood that tube 52 may be formed of any suitable size and/or shape, including square, rectangular and other geometric configurations.

A zinc layer 54 is bonded to the metal tube outer surface 53. It is to be understood that any suitable zinc layer 54 may be used in accord with the present invention. However, in the preferred embodiment, the zinc layer is selected from the group consisting of zinc plating, zinc nickel alloys, zinc cobalt alloys, zinc aluminum alloys, and mixtures thereof.

A surface treatment layer 56 is bonded to the zinc layer 54. Any suitable surface treatment layer 56 may be used. However, in the preferred embodiment, surface treatment layer 56 is selected from the group consisting of a zinc/aluminum/rare earth alloy, phosphate, chromate, and mixtures thereof.

The phosphate and/or chromate may be applied in any suitable manner. In the preferred embodiment, a hot phosphoric acid is used. Without being bound to any theory, it is believed that this acid etches into the metal surface, leaving a phosphate crystalline structure in the metal, which structure aids in subsequent adhesion of polymeric materials. Over electroplating, a wet bath chromate may be used, after which the metal is rinsed well. Chromium oxides are left on the metal, which are believed to aid in corrosion resistance, and which, although optional, are further believed to enhance the advantageous properties of the phosphate. Over the zinc/aluminum/rare earth alloy treatment, a dry chromate may be used which does not require subsequent rinsing.

The zinc/aluminum/rare earth alloy used is preferably GALFAN, commercially available from Eastern Alloys, Inc. In Maybrook, N.Y.; licensed from the International Lead Zinc Research Organization, Inc. located in New York, N.Y.; and described in U.S. Pat. No. 4,448,748, discussed more fully above. Particularly preferred is the combination of the GALFAN with the phosphate, or the GALFAN with the phosphate and chromate. Without being bound to any theory, it is believed that either of these two combinations for the surface treatment layer 56 are particularly advantageous and useful in the present invention.

It is to be understood that the zinc layer 54 and/or surface treatment layer 56 may be optional components of the present invention. Various polymeric compositions may be applied directly to a bare metal surface, especially for decorative purposes. Further, it is contemplated that various polymeric compounds and/or blends, including those containing suitable ionomers, may substantially bond to an untreated metal surface, thereby giving the numerous corrosion and abrasion resistant properties enumerated herein.

A first polymeric layer 58 is bonded to the surface treatment layer 56. It is to be understood that any suitable polymeric layer may be used which suitably bonds to the surface treatment layer 56, and in turn, suitably bonds to subsequent polymeric layers, if any. In the preferred embodiment, the first polymeric layer 58 is selected from the group consisting of a thermoplastic elastomers, ionomers, polyamides, fluoropolymers, and mixtures thereof.

A second polymeric layer 62 may be bonded to the first polymeric layer 58 (not shown). It is to be understood that any suitable polymeric layer may be used which suitably bonds to first layer 58, and which provides suitable mechanical and chemical corrosion resistance. In the preferred embodiment, the second polymeric layer 62 is selected from the group consisting of polyamides, thermoplastic elastomers, fluoropolymers, and mixtures thereof.

The multi-layer tube 50 may further comprise a third polymeric layer 60 interposed between, and bonded to the first and second polymeric layers. It is to be understood that any suitable polymeric layer may be used which suitably bonds to first layer 58 and to the second layer 62 and which may optionally provide suitable cushioning, if desired. In the preferred embodiment, the third polymeric layer 60 is selected from the group consisting of ionomers, polyamides, ethylene vinyl alcohols, polyolefins, and mixtures thereof.

It is to be understood that any or all of the three layers, 58, 62, 60 may include multiple sublayers (not shown). Further, it is to be understood that each of the layers and/or sublayers may be formed from a single compound listed in the relevant group, or from a combination thereof. Still further, it is to be understood that each of the layers/sublayers may be comprised of the same material. The thickness of the combined polymer layers can be as little as 0.004 inch, and can be made even thinner. Successful coatings have been applied having combined polymer layer thicknesses of 0.004 inch, 0.005 inch, 0.006 inch, 0.007 inch, 0.009 inch and 0.010 inch, with a preferred range of 0.005 inch to 0.010 inch.

Examples of suitable compounds for each of the layers will be described hereinafter.

One of the advantages of the present invention is that a chemical or mechanical bond is formed between all the layers. It is believed that good bonding prevents moisture buildup beneath the layers, which buildup greatly increases the likelihood of corrosion.

As used herein, ionomers are defined as thermoplastic polymers that are ionically crosslinked. Ionomer technology entails the reaction of copolymers to form bonds between the acid groups within a chain and between neighboring chains. Ionomers generally consist of an organic backbone bearing a small proportion of ionizable functional groups. The organic backbones are typically hydrocarbon or fluorocarbon polymers and the ionizable functional groups are generally carboxylic or sulfonic acid groups. These functional groups, which generally reside on no more than about 10% of the monomer units in the polymer, may be neutralized, for example with sodium or zinc ions.

The presence of these ionic groups gives the polymer greater mechanical strength and chemical resistance than it might otherwise have. The ionomer is resistant to dissolution in many solvents because of its unconventional chemical character, often being too ionic to dissolve in non-polar solvents and too organic to dissolve in polar solvents. Ionomers which can successfully be employed in the present invention include copolymers of: styrene with acrylic acid; ethyl acrylate with methacrylic acid; and ethylene with methacrylic acid.

The presence of ions in an otherwise organic matrix is generally not thermodynamically stable. As a result, these materials undergo slight phase separation in which the ions cluster together in aggregates. These ionic clusters are quite stable and may contain several water molecules around each metal ion. They act partly as crosslinks and partly as reinforcing filler, which may provide the greater mechanical strength that ionomers exhibit.

A further general discussion of ionomers can be found in *The Chemistry of Polymers* by John W. Nicholson, published by the Royal Society of Chemistry, Thomas Graham House, Cambridge England (1991), pp. 147–149.

It is to be understood that any suitable ionomer resin may be used in the present invention. The suitable ionomer resin employed has substantially similar physical properties and performs in a substantially similar manner to the ionomers disclosed herein. Without being bound to any theory, it is believed that the presence of the ionomer may greatly enhance the excellent bonding formed between the metal surfaces 13, 14, 16 and the subsequent polymer layer(s). In the preferred embodiment, SURLYN ionomer resins are used. Other suitable ionomers are commercially available under the tradename IOTEK from Exxon Chemical Co. located in Houston, Tex.

SURLYN® is an ionomer resin commercially available from E.I. DuPont de Nemours & Co., located in Wilmington, Del. The chemical name of SURLYN is ethylene methacrylic acid copolymer—partial metal salt. Its chemical formula is represented as $[(CH_2\text{---}CH_2)_x(CH_2CCH_3COO^- M^+)_y]_n$. In the SURLYN Ionomer Resins, ethylene and methacrylic acid copolymers are partially reacted with metallic salts.

General physical characteristics of the SURLYN Resins include a melting point between about 80° C. and about 100° C. The resins are insoluble in water and are supplied in the form of solid white pellets. The compounds have a mild methacrylic acid odor. SURLYN ionomer resins have excellent impact toughness, flexibility, cut and abrasion resistance, low temperature performance and long term durability, especially at specific gravities of less than one. The SURLYN Ionomer Resins have room temperature tensile impact properties ranging from about 730 to about 1325 $kJ/m^2$ (345 to 630 $ft\text{-}lb/in^2$). This impact performance does not drop substantially with temperature, in that the compound can offer tensile impact as high as 1190 $kJ/m^2$ (565 $ft\text{-}lb/in^2$) at −40° C. Various grades of the SURLYN Ionomer Resins have a notched Izod rating as high as 853 J/m (16 ft-lb/in). The SURLYN Resins are also highly resistant to chemical attack and permeation by liquids. They have high melt strengths and contain no plasticisers. Ionomers adhere well to metals and to finishes of epoxy and urethane. The resins range in specific gravity from 0.94 to 0.97 $g/cm^3$.

Of the SURLYN Resin grades, a preferable grade is SURLYN 8528. Also preferred is SURLYN 8527, which has the same physical properties as 8528, but offers greater clarity. It is to be understood that any grade of SURLYN is contemplated as being of use in the present invention, however, the grade of SURLYN employed should not possess a melt viscosity which would be so high as to hinder the advantageous functioning of the present invention. Typical physical properties of SURLYN 8528 will be discussed hereinafter.

SURLYN 8528 has excellent abrasion and cut resistance. Its processing temperature is about 450° F. (232° C.). Its density is 58.6 lb/ft$^3$ (0.94 g/cm$^3$). Its brittle temperature is −139° F. (−95° C.). Its volume resistivity is 1.00×10$^{16}$ Ohm cm. Its dielectric constant is 2.40×10$^6$ Hz.

The SURLYN 8528 toughness properties include tensile impact at 23° C. (73° F.) of 1160 kJ/m$^2$ (550 ft-lbf/in$^2$). This is as found under ASTM Method D-1822S. Another toughness property is measured by the Notched izod test. This particular test is not as relevant for tubing—a more preferred test is a Cold Temperature Impact Test as described in Performance Requirements paragraph 9.11 in SAE Standard J844 as revised in June of 1990. However, the SURLYN 8528 Notched izod is 610 J/m (11.4 ft-lb per inch of notch) under ASTM Method D-256.

For low temperature toughness, the SURLYN 8528 tensile impact at −40° C. (−40° F.) is 935 kJ/m$^2$ (445 ft-lbf/in$^2$) under ASTM Method D-1822S.

Durability is measured by abrasion resistance under ASTM Method D-1630. The SURLYN 8528 resistance is 600 under the NBS index. For clarity measurement, the haze at 0.64 cm (0.25 in) under ASTM Method D-1003A is 6%. The specific gravity under ASTM Method D-792 is 0.94 g/cm$^3$.

The stiffness and other mechanical properties of SURLYN 8528 are given by the following. The flexural modulus at 23° C. (73° F.) under ASTM Method D-790 is 220 MPa (32 kpsi). The tensile strength, yield strength and elongation are measured on Type IV bars, compression molded, with a cross head speed of 5.0 cm/min (2 in/min). All three of these properties are measured by ASTM Method D-638. The tensile strength is 29 MPa (4.2 kpsi); the yield strength is 12.4 MPa (1.8 kpsi) and the elongation is 450%. The Ross Flex was tested on compression molded samples 3.2 mm thick, pierced 2.5 mm wide, under ASTM Method D-1052. Pierced at 23° C. (73° F.), the Ross Flex is 3000 cycles to failure; and pierced at −29° C. (−20° F.) is less than 100 cycles to failure. The MIT flex is an accelerated stress crack test on a strip 25 mil. thick, flexed through 270° at 170 cycles per minute with one kilogram load in tension—#04 head. This is a test developed by Dupont. The result on the SURLYN 8528 was 2100 cycles to failure. The Shore D hardness is about 60 to 62.

General physical characteristics of SURLYN 8528 include cation type: sodium. The melt flow index, with the material dried 16 hours in a vacuum oven at 63° C. (145° F.) under ASTM Method D-1238 was 1.3 g/10 minutes. The area yield at 0.25 mm (0.10 in) was 4.2 m$^2$/kg (20.1 ft$^2$/lb).

Thermal characteristics include a heat deflection temperature at 455 kPa (66 psi) of about 44° C. to 51° C. (111° F. to 125° F.) under ASTM Method D-648. The Vicat temperature under ASTM Method D-1525-70 Rate B is 71° C. to 73° C. (159°–163° F.). The melting point and freezing point is determined by differential thermal analysis. The melting point is 94° C. to 96° C. (201° F. to 204° F.); and the freezing point is 75° C. (167° F.). The coefficient of thermal expansion from −20° C. to 32° C. under ASTM Method D-696 is 14×10$^{-5}$ cm/cm/°C. The flammability under ASTM Method D-635 is 22.9 mm/min (0.9 in/min); and the flammability passed the Motor Vehicle Safety Standard 302. The thermal conductivity is 6.0×10$^{-4}$ cal/cm$^2$/sec/°C./cm. The specific heat at various degrees will be given. At −20° C. (68° F.), mean: the specific heat is 0.43 cal/gm/° C.; at 60° C. (140° F.), mean: the specific heat is 0.58 cal/gm/° C.; at melting point, mean: the specific heat is 0.86 cal/gm/° C.; and at 150° C. (302° F.), mean: the specific heat is 0.55 cal/gm/° C.

The thermoplastic elastomers which can successfully be employed in the tubing 50 of the present invention are commercially available under tradenames such as: SANTOPRENE®, a thermoplastic rubber commercially available from Advanced Elastomer Systems of St. Louis, Mo.; KRATON®, a thermoplastic rubber composed of a styrene-ethylene/butylene-styrene block copolymer commercially available from Shell Chemical Co. of Houston, Tex.; SARLINK, an oil resistant thermoplastic commercially available from Novacor Chemicals of Leominster, Mass.; and VICHEM, a family of polyvinyl chloride compounds commercially available from Vichem Corporation of Allendale, Mich.

Of the various thermoplastic elastomers suitable in the present invention, HYTREL is a preferred compound. HYTREL is a thermoplastic elastomer commercially available from E.I. DuPont de Nemours & Co., located in Wilmington, Del. It is contemplated that any grade of HYTREL is useful in the present invention, preferably such a grade which possesses a Shore D Hardness ranging between about 40 and about 55, and still more preferably, one having a Shore D Hardness of about 40. Grades having D40 (Shore) hardness include G-4074; G-4078; 4056; and 4059 FG.

The HYTREL grades listed above are polyester thermoplastic elastomers, and special features include excellent heat aging and oil (at high temperatures) resistance; can be used in light colored products; excellent low temperature properties, fatigue, flex and creep resistance.

Principal properties of the HYTREL grades listed above are as follows. Melt flow (condition): between about 5.2 (E) and about 5.4 (E); about 8.5 (L). Melting point: between about 298° F. and about 383° F. Density: between about 1.11 g/cm$^3$ and about 1.18 g/cm$^3$. Tensile strength, yield: between about 450 lb/in$^2$ and about 550 lb/in$^2$ (with 10% strain). Tensile strength, break: between about 2.00×10$^3$ lb/in$^2$ and about 4.05×10$^3$ lb/in$^2$. Elongation, break: between about 170% and about 600%. Flexural modulus: between about 8.00×10$^3$ lb/in$^2$ and about 9.80×10$^3$ lb/in$^2$. Izod, Notched, R.T.: about 999 ft-lb/in (no break). Vicat Soft Point: between about 226° F. and about 273° F. Water Absorption, 24 hour: between about 0.60% and about 2.50%.

Suitable polyamides which can be employed in the present invention are generally designated as nylons and include 12 carbon block polyamides, 11 carbon block polyamides, and zinc chloride resistant 6 carbon block polyamides. Of these, 112 carbon block polyamides (Nylon 12) and zinc chloride resistant 6 carbon block polyamides (Nylon 6) are preferred. The 6-carbon block polyamide, Nylon 6, either inherently exhibits zinc chloride resistance or contains sufficient quantities of modifying agents to impart a level of zinc chloride resistance greater than or equal to that required by Performance Requirement 9.6 as outlined in SAE Standard J844 (Revised June 1990), i.e. non-reactivity after 200 hour immersion in a 50% by weight zinc chloride solution. Nylon 6 can also be modified with various plasticizers, flame retardants and the like in manners which would be known to one reasonably skilled in the art.

Suitable fluoropolymers which can be successfully employed in the present invention include polyvinylidine fluoride, polyvinyl fluoride, ethylene tetrafluoroethylene, and mixtures thereof. The material can also be a graft copolymer of the preceding materials together with a fluorine-containing polymer such as copolymers of vinylidine fluoride and chlorotrifluoroethane. Suitable material employed may contain between about 60% and about 80% by weight polyvinylidine difluoride. Materials so formed have a melting point between about 200° C. and about 220° C. and a molding temperature between about 210° C. and about 230° C. Further suitable fluoropolymers include: copolymers of a vinyl fluoride and chlorotrifluoroethylene, with the vinyl fluoride material being selected from the group consisting of polyvinylidine fluoride, polyvinyl fluoride, and mixtures thereof; a copolymer of vinyl fluoride material and ethylene tetrafluoroethylene, and mixtures thereof. The material of choice exhibits an affinity to polymers employed in the first 58 second 62 or third 60 layers, such as, for example, Nylon 12 or Nylon 6. Some suitable fluoropolymers are commercially available under the tradename "ADEFLON A" from Atochem Inc. elf Aquitaine Group of Philadelphia, Pa.

Other suitable materials, especially useful in an interposed layer 60 or in sublayers of any of the three layers 58, 62, 60 include ethylene vinyl alcohol, selected from the group consisting of copolymers of substituted or unsubstituted alkenes having less than four carbon atoms and vinyl alcohol, and mixtures thereof. Also useful are copolymers of alkenes having less than four carbon atoms and vinyl acetate. Also suitable are polyolefin compounds, including, but not limited to polyethylene, low density polyethylene, and polypropylene.

The following is a brief description of the various exemplary, commercially available compounds described hereinabove. It is to be understood that these are examples of suitable compounds for illustrative purposes. Thus, it is to be further understood that other suitable compounds are contemplated and are within the scope of the present invention.

The thermoplastic elastomer SANTOPRENE®, commercially available from Advanced Elastomer Systems, L.P. of St. Louis, Mo. is a thermoplastic rubber FR grade. Aside from the thermoplastic rubber, it also contains antimony trioxide flame retardant, and may contain carbon black, CAS No. 1333-86-4. SANTOPRENE® thermoplastic rubber may react with strong oxidizing chemicals, and also reacts with acetal resins at temperatures of 425° F. and above, producing decomposition of the acetal resins, and formaldehyde as a decomposition product. Decomposition of halogenated polymers and phenolic resins may also be accelerated when they are in contact with SANTOPRENE® thermoplastic rubber at processing temperatures. Physical characteristics of SANTOPRENE® include a slightly rubber-like odor, and the appearance of black or natural (colorable) pellets. It is thermally stable to 500° F. The flash ignition temperature is greater than 650° F. by method ASTM-D 1929-77, and by the same method, self-ignition temperature is above 700° F. The typical specific gravity is 0.90 to 1.28. The material has various hardnesses which are suitable in the present invention, however, in the preferred embodiment, the SANTOPRENE® thermoplastic rubber having an 80 Shore A hardness is utilized. The SANTOPRENE® thermoplastic rubber is designed to offer fluid and oil resistance equivalent to that of conventional thermoset rubbers such as neoprene. The resistance of the SANTOPRENE® rubber grades to oils can be classified by using the SAE J200/ASTM D2000 standard classification system for rubber.

ADEFLON A is a polyvinylidene fluoride commercially available from Atochem Inc. elf Aquitaine Group of Philadelphia, Pa. Its typical use is as a binding material for polyamides/polyvinylidene fluoride. The product is stable under normal use conditions, and above 230° C., there is a release of monomer traces. Physical properties include: at 20° C. the material is a granulated solid having a white/slightly yellow color and no odor. The crystal melting point is 175° C., and beginning of decomposition is 230° C. In water at 20° C., the product is non-soluble. The density at 20° C. bulk is 1 to 1.1 g/cm$^3$.

The Vichem Corporation vinyl compounds are polyvinyl chloride compounds composed of a vinyl resin and functioning additives. The ingredients include a stabilizer, a resin CAS No. 75-01-4, a plasticizer CAS No. 68515-49-1, an epoxy soya oil CAS No. 8013-07-8, a filler CAS No. 1317-65-3 and carbon black CAS No. 1333-85-4. The specific gravity is 1.35 and the compound has the appearance of pellets and has a characteristically bland odor.

KRATON®, commercially available from Shell Chemical Co. of Houston, Tex., is a thermoplastic rubber having a specific gravity of 0.90 to 1.90 and a hardness of 15A to 60D. The tensile strength is up to 2,500 psi. The elongation is up to 750% and the tear strength is up to 750 pli (130 kN/m). The flex modulus is 750 to 100,000 psi. The service temperature is −70° C. to 150° C. The ozone resistance is excellent, UV resistance is excellent, fluid resistance is fair to excellent, and flame resistance is fair to excellent.

SARLINK is a thermoplastic elastomer commercially available from Novacor Chemicals Inc. of Leominster, Mass. The specific gravity ranges from 1.13 to 1.22. The modulus at 100% ranges between 260 and 570 psi. The tensile strength ranges between 780 and 2,060 psi. The ultimate elongation ranges between about 345 and about 395%. The tear strength ranges between about 81 and about 196 pli. The tension set ranges between about 4 and 6%. It has excellent fluid resistance to acids and alkalis, aqueous solutions, organic solvents, petroleum oils and fuels, automotive fluids such as automatic transmission, power steering, etc. and industrial fluids. It has fair fluid resistance to automotive fluids such as hydraulic brake, lithium grease, antifreeze, etc. and poor resistance to organic solvents. The SARLINK product is a solid, black pellet material with a mildly pungent odor. It is insoluble in water at 20° C.

Another fluoropolymer suitable for use in the present invention is KYNAR, commercially available from Atochem Inc. elf Aquitaine Group of Philadelphia, Pa. KYNAR is a vinylidene fluoridehexafluoropropylene copolymer. Its chemical name is 1 propene,1,1,2,3,3,3-hexafluoro-1,1-difluoroethene polymer. Its melting point is 155°–160° C. Its specific gravity is 1.77–1.79 at 23° C. It appears translucent and has no odor.

Another suitable fluoropolymer is CEFRAL SOFT XUA-2U, commercially available from Central Glass Company, Ltd., Chiyodaku, Tokyo, Japan is a copolymer containing 40% vinylidene fluoridechlorotrifluoroethylene copolymer, 30% polyvinylidene fluoride and 30% Nylon 12. The material has a specific gravity of 1.45 at 23° C., a melting point of 173° C. and a mold temperature of 220° F. The material has an elongation at break of 478% and a tensile strength of 430 Kgf/cm$^2$.

Yet another suitable fluoropolymer is TEFZEL, which is commercially available from DuPont Polymers, Specialty Polymer Division, Wilmington, Del. The material designates a family of ethylene tetrafluoroethylene fluoropolymers having various commercial grades. The material has a melting point between 255° C. and 280° C. as determined by ASTM method DTA D3418. The specific gravity for the material is between 1.70 and 1.72 as determined by ASTM method D792. Impact strength for the material at −65° F. is between 2.0 ft-lbs/inch and 3.5 ft-lbs/inch as determined by ASTM method D256, commonly referred to as Notched Izod Impact Strength. The hardness durometer as determined by ASTM method D2240 for all grades of TEFZEL is D70. Tensile strength at 73° F. is between 5,500 psi and 7,000 psi. TEFZEL was first introduced in 1970 having outstanding mechanical strength, high temperature and corrosion resistance. The material is available in three production grades, TEFZEL 200, TEFZEL 210 and TEFZEL 280 which can be applied in the present invention. Ultimate elongation at break is between 150% and 300%, depending on the grade as determined by ASTM method D638.

In the first embodiment, the multi-layer tube 50 has a first polymeric layer 58 consisting essentially of an ionomer and a nylon, such as ethylene methacrylic acid copolymer—partial metal salt, and Nylon 12. This may be in any suitable percent composition and may have any additional suitable additives. In the preferred embodiment, the percent composition ratio is between about 10% and about 70% ethylene methacrylic acid copolymer—partial metal salt, and between about 90% and about 30% Nylon 12. More preferably, this percent composition ratio is between about 40% and about 60% ethylene methacrylic acid copolymer—partial metal salt, and between about 60% and about 40% Nylon 12. The second polymeric layer 62 consists essentially of polyamide; with Nylon 12 being preferred.

The third layer 60 may be made of any of the suitable materials listed hereinabove. Alternately, this third layer 60 may be a "regrind" or "recycle" of the suitable polymeric materials enumerated above. It is to be understood that the definition of "regrind" or "recycled" material as used herein comprises any generation of "regrind" or "recycled" material which substantially possesses between about 65% and about 95% (or higher) of each of the cold temperature impact, viscosity and elongation properties of the comparable virgin material; more preferably, possesses between about 80% and 95%, and still more preferably possesses between about 90% and 95%. However, it is to be understood that any suitable regrind which performs in the desired manner in the present invention is contemplated and may successfully be used herein. If such a "regrind" is used as third layer 60, it is preferred that a virgin material be used as second (outer) layer 62.

Among some advantages of regrind material is that it is believed that the regrind is a lower viscosity material, which may enhance extrusion capabilities. Further, regrind is more rigid than virgin material, thereby improving penetration resistance as well as resistance to other damaging wear characteristics.

In the first preferred embodiment, the metal tube 52 having an extruded multiple plastic layer coating the outer surface also includes continuous interior tube 64 made of a suitable non-reactive material. The interior tube 64 has an outer wall surface in contact with the interiorly oriented wall of the metal tube 52 to provide essentially uniform mating engagement between the two concentrically disposed tubes. The interior tube conforms to the interiorly oriented wall of the metal tube 52. The inner wall surface of the interior tube defines a hollow central tubing conduit extending longitudinally through the length of the composite tube of the present invention.

As previously discussed in connection with the process of the present invention, the interior tube 64 may be constructed from any suitable material which is non-reactive in the particular application for which the composite tube 50 of the present invention is to be employed. The material may be either metal or polymeric as desired and required. The non-reactive material employed may be any material suitable for formation of lengths interior tubing which is non-reactive with materials to be conveyed therein. In particular, the polymeric material employed is substantially non-reactive in the presence of short chain alcohols, various corrosive agents, metal oxidizers, and the like.

As indicated previously, the polymeric material of choice employed in the interior polymeric layer is a thermoplastic material exhibiting thermal stability at temperatures of approximately 500° F. The material employed is preferably extrudable as either a monoaxially or biaxially oriented organic film. In the preferred embodiment, the interior polymeric layer has a wall thickness less than about 0.02 inch with a wall thickness less than about 0.005 inch being preferred. In the preferred embodiment, the interior polymeric layer polymeric material is selected from the group consisting of polyamide resins, polytetrafluoroethylene resins, and mixtures thereof. Examples of suitable polyamide resins for use in the present invention include nylons such as Nylon 12, Nylon 11 and Nylon 6. Examples of suitable polytetrafluoroethylene resins include those having the trade designation TEFLON.

The non-reactive material employed in the tube 52 of the present invention has a wall thickness sufficient to isolate the interiorly oriented wall surface of the metal tube from any harmful effects of any fluid conveyed therethrough. The thickness of the non-reactive material is sufficient to maintain the integrity of the interior tube.

The interior non-reactive tube is positioned within the outer metal tube so as to engage its interiorly oriented wall in an essentially uniform manner such that the central shaft is completely defined by and surrounded by non-reactive material throughout its longitudinal length.

The tube of the first embodiment of the present invention has an interior fluid contacting surface characterized by corrosion resistance and resistance to chemical reactions heretofore not found in small-diameter monowall or double wall metal tubing while eliminating the problems found in monolith plastic lines such as melting, static discharge, poor formability, pressure restriction, permeation, and degradation previously inherent in supplemental or polymeric tubing.

The tube of the first embodiment of the present invention can also be formed by a process in which a length of interior tubing non-reactive material having a predetermined outer diameter is positioned within the inner diameter of metal tube of a suitably analogous length. The interior tubing may be inserted at any time contemporaneous to or after the application of the exterior multiple layers of polymeric material.

It is also within the purview of this invention to prepare tube having multiple polymeric layers extruded thereon without the inner polymeric layer. Such tube is preferably made of a metal such as steel and will have at least two polymeric layers extruded onto its exterior surface. The tube can be prepared in the manner described previously with the omission of the steps pertaining to insertion or placement of the interior non-reactive tube.

A polymer or plastic coated composite metal tube 210, 210' can also be prepared by an alternate process to provide a tube or conduit which is highly resistant to both bursting pressure and vibration and is resistant to corrosion, temperature variations, wear and tear, as well as the impact of flying rocks in which the polymeric or plastic material exhibits a high degree of adhesion to the metal tube.

In the process of the alternate embodiment, a single-wall or double-wall metal tube is, preferably, pretreated by suitable galvanization and chromatization processes prior to application of a polymeric material to its exterior surface. The tube is, preferably, made of steel strips which are 360° brazed, in the case of double-wall, or side seam welded, in the case of single-wall tube.

The steel tube 212, 212' used should be either a double-wrapped steel conduit which conforms to DIN standard 74 234 (corresponds to ISO norm 4038) or a single-walled steel conduit which conforms to DIN standard 2393. Due to factors related to its manufacturing process, the exterior of the double-wrapped steel conduit may be coated with a thin residue of copper soldering material which will not cause any significant problems with ensuing galvanization. For both single-walled lengthwise-welded and double-wrapped steel tubes, the wall thicknesses should be between 0.5 and 1.0 mm. The outside diameter of the uncoated double-wrapped steel conduits should be between 3.2 and 10.0 mm, and should be between 3.2 and 12.0 mm for the uncoated single-walled lengthwise-welded steel conduit. When used for brake cables, the outside diameter is preferably between 4.75 mm and 6.0 mm. For fuel lines, it should be between 6.0 mm and 10.0 mm, whereby the preferred value is 8.0 mm.

The double-walled steel tubes that conform to DIN standard 74234 have inside and outside copper=plating with a metallic finish. The double-wall steel tube is preferably made from a steel strip formed in a 220° forming process that has metal bonding material applied on both sides by any suitable process such as electroplating, galvanization or the like. The unsealed tube mi be brazed, hard-soldered or sealed by any suitable process. In general, the metal bonding material is a metal or metal alloy capable of fusably bonding with the steel strip and adhering to the underlying steel material before and during the fusion process. Suitable bonding metals include copper, copper alloys, and the like, alloys with copper being preferred. In hard-soldering operations, the copper layer is preferably between 1 and 5 $\mu$m thick with a layer of about 3 $\mu$m being preferred. The surfaces of such double-wrapped steel conduits are smooth, free of flakes or the kinds of sheet rolling defects that sometimes occur with stretched tubing, and free of oxide scales.

The following table shows preferred values for various outside diameters of double-rolled steel conduits. These values apply to stretched and unstraightened lengths and are set forth in Table I:

| Outside diameter of the tube (mm) | 4.75 | 5.0 | 6.0 | 8.0 | 9.5 | 10.0 |
|---|---|---|---|---|---|---|
| Bursting pressure (bar) | 1100 | 940 | 800 | 570 | 470 | 450 |
| Max. interior operating pressure (bar) | 410 | 380 | 320 | 230 | 190 | 180 |
| Resistance to tension Rm (N/mm$^2$) | | | 310–410 | | | |
| Stretch limit Re (N/mm$^2$) | | | 290 (max.) | | | |
| Breaking point L$_o$ | | | 11.3/Fo:min. 25% | | | |
| Dilation according to DIN standard 50135 | | | 20% of inside diameter | | | |

In the alternate embodiment, the exterior surface of the tube has a zinc layer 214 having a thickness between about 10 and 200 $\mu$m. The zinc layer can be imparted by any suitable method. In the process of the alternate embodiment, the zinc layer is, preferably, imparted by one of two zinc-plating methods: liquid zinc-plating (also referred to as fired-zinc plating) or, preferably, galvanized zinc plating. The zinc layer imparted by the galvanized zinc-plate method is between about 10 and 30 $\mu$m while the thickness of the layer imparted by the liquid zinc-plating process can be up to approximately 200 $\mu$m. The thickness of zinc galvanized layer is preferably between about 15 and 25 $\mu$m.

Figure 7:
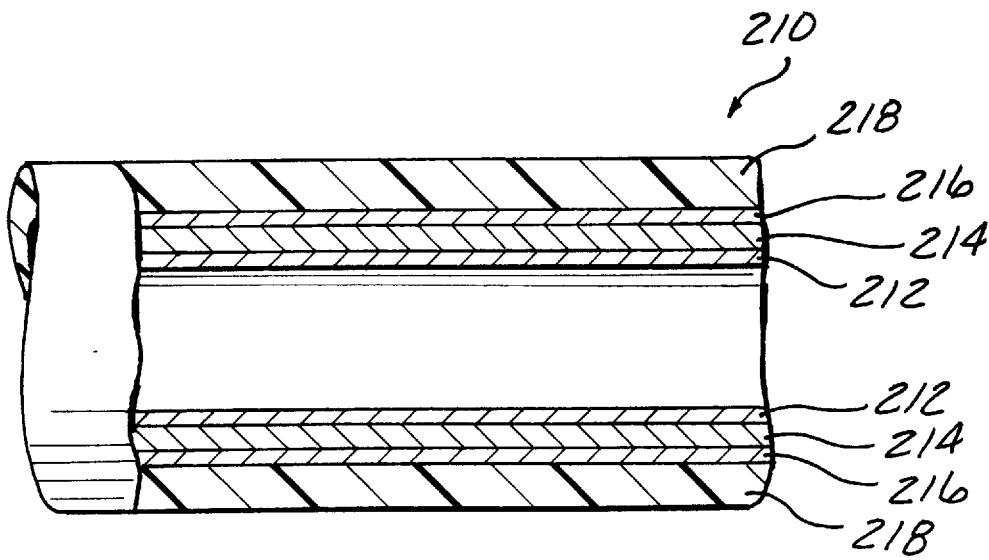
FIG. 7 is a cross-sectional view of a tube prepared according to the alternate embodiment of the present invention with thicknesses exaggerated for purposes of illustration.

It is to be understood that a transition layer is commonly formed during liquid zinc-plating processes between the exterior surface of the steel conduit and the zinc layer. The transition layer is not shown in FIGS. 7 and 8.

The tube of the alternate embodiment also includes a chromate layer 216, 216' in overlying relationship to the zinc layer. The chromatization layer is preferably a green or olive chromatization layer due to the high corrosion resistance characteristics imparted by olive chromatization.

The olive chromatization layer can be applied to the zinc layer by any suitable method. In the preferred alternate embodiment, the galvanized tube is dipped into an olive chromatization immersion. During this process, chromates that provide corrosion protection are formed on the zinc layer. The zinc and chromate layers preferably have a combined thickness of approximately 15 $\mu$to 25 $\mu$m.

In the last step of the procedure of the alternate embodiment, the polymeric layer 218, 218' is applied to the chromate layer through extrusion to provide a coating thickness of approximately 100–500 $\mu$m, with a range between about 125 $\mu$m and about 175 $\mu$m. The ideal thickness is 150 $\mu$m.

In the preferred version of this alternate embodiment, the polymeric material of choice is corrosion resistant, durable and resistant to wear and tear. Additionally, the polymeric material used as the coating layer should adhere quite firmly to the metal tube and not become loose through either mechanical stress or localized damage to the polymer layer lest the metal tubing begin to corrode in manners which may remain largely undetectable from outside the tube material. Such polymeric material employed in the outer layer or layers should not only resist corrosion caused by external factors such as road salt, etc., but should also provide protection from potentially damaging materials found in the automotive environment, i.e. fuel, brake fluid and battery acid. Furthermore, the polymeric material of choice should posses a certain level of temperature resistance particularly against the higher temperatures which can occur in the engine compartment.

Thus, the tube of the alternate embodiment of the present invention is configured to provide a twofold level of safety. The use of the most durable polymer material feasible provides the enumerated characteristics of corrosion resistance and durability and, should that fail, the underlying metal tube will exhibit corrosion resistance for an extended period up to approximately 1 to 5 years as a result of the zinc plating and chromate layers imparted thereon.

The polymeric material employed in the outer layer of the tube of the alternate embodiment is a thermoplastic selected from the group consisting of fluoropolymers such as polyvinyl fluoride, (PVF), polyamides, such as 12 carbon block polyamides, 11 carbon block polyamides, 6 carbon block polyamides, 6.6 carbon block polyamides and mixtures thereof as well as polyamide fluorocarbon mixtures. Other polymeric materials which can be employed in the outer polymeric layers are those previously enumerated with regard to the previous embodiments, the discussion found therein is incorporated at this point.

In the tube of the alternate embodiment of this invention, the preferred polymeric is an extrudable thermoplastic polyamide selected from the group consisting of 12 carbon block polyamides, 11 carbon block polyamides, 6 carbon block polyamides, zinc chloride resistant 6 carbon block polyamides, 6.6 carbon block polyamides and mixtures thereof, with 12 carbon block polyamides being most preferred. Suitable 12 carbon block polyamides are commercially available from Hüls North America under the tradename VESTAMID with the grades VESTAMID L 2140 and VESTAMIDE Z 4881 being most preferred. These materials are commonly referred to as Nylon 12.

It has been unexpectedly discovered that high levels of adhesion have been attained between the chromate layer and the Nylon 12 layer. This phenomenon is extremely advantageous in the tube of the alternate embodiment of the present invention.

In preparing the tube of the alternate embodiment of the present invention, the polymeric material is applied in overlying relation to the chromate layer 216 through extrusion.

During the extrusion process, the metal tube is preferably heated to the approximate temperature level of the polyamide that is to be extruded onto its surface, thus temperatures are preferably between about 240 and 260° C. Without being bound to any theory, it is believed that this temperature elevation enables the polyamide to reach a high level of adhesiveness to the underlying chromate layer. The aforementioned equalization between the temperature of the conduit and that of the polyamide to be extruded does not refer to temperature equalization in the strictest sense; instead, it means that temperature conditions of the two materials should approximate one another, in order to avoid subsequent peeling of the plastic coating that occurs when extrusions are applied to cold tubing. Generally, the difference in temperature values can amount to a few degrees, but should be no more than approximately plus or minus 20° C. to plus or minus 30° C. It is conceivable that even greater temperature differences can occur during extrusion.

Without being bound to any theory, it is believed that heating the chromated zinc-plated steel conduit may cause a slight roughening of the chromate surface, which, may create a particularly strong bond between the chromate layer 214, 214' and the polyamide layer 218, 218' that has been extruded onto it.

Extrusion can be accomplished by any suitable co-extrusion or cross-head extrusion method such as described in greater detail previously. After application of the polymeric material, the tube can be cooled by any suitable method such as immersion into water or some other liquid and, then, subjected to other post processing steps as desired.

Figure 8:
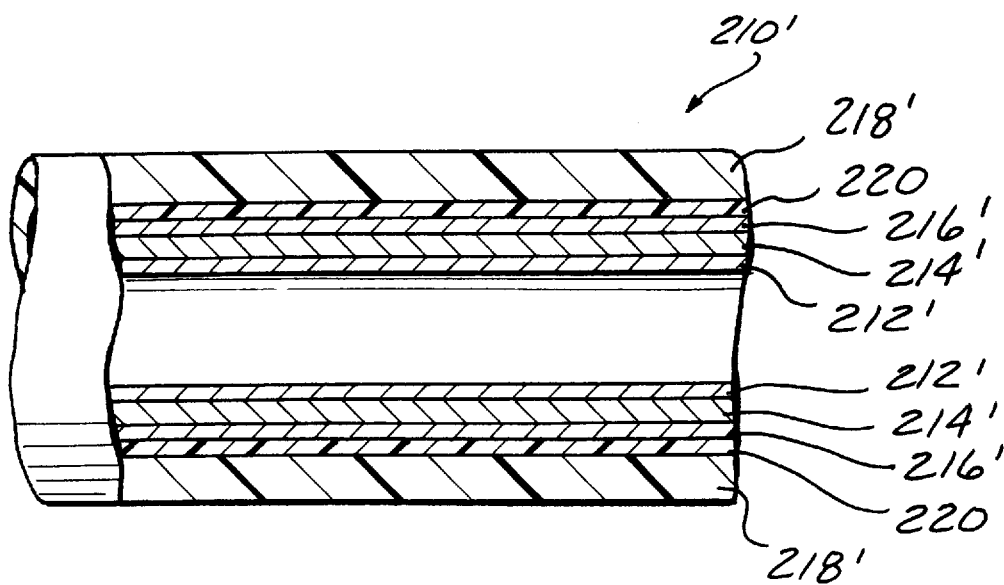
FIG. 8 is a cross-sectional view of a tube prepared according to the alternate embodiment of the present invention with thicknesses exaggerated for purposes of illustration having a connective layer interposed between the outer polymeric coating and the chromatization layer.

The tube of the alternate embodiment of the present invention may also include a connective or bonding layer 220 interposed between the exterior polymeric layer 218' and the chromate layer 216' to promote greater adhesion therebetween as depicted in FIG. 8. The connective layer 220 may be composed of any suitable thermoplastic material extrudable at or near the processing temperatures for application of the outer polymeric layer 218 which exhibits an affinity for both the outre polymeric layer 218 and the surface of the metal tube.

The tube of the alternate embodiment of the present invention can be successfully employed in motorized vehicles in areas such as brake lines, fuel lines and in hydraulic systems. In general, the underlying metal tube employed in the alternate embodiment will be such that it can meet suitable standards for operation under these applications. Preferably, double-wrapped steel tube employed in this embodiment will be formed according to the method and standards outlined in DIN Standard 74234. Single-wall tubing is single side longitudinally welded according to the method and standards outlined in DIN Standard 2393.

To further illustrate the composition, the following examples are given. It is to be understood that these examples are provided for illustrative purposes and are not to be construed as limiting the scope of the present invention.

EXAMPLE I

A $3/16$ inch brazed steel tube had a GALFAN coating of 78 g/m$^2$ and a phosphate coating of 120–250 mg/ft$^2$. Applied thereto was a coating of 0.005 inch to 0.010 inch Nylon 12. In a subsequent test, two layers of Nylon 12 having a total thickness between about 0.005 inch to 0.010 inch were also applied. In another subsequent test, three layers of Nylon 12 having a total thickness between about 0.005 inch to 0.010 inch were also applied. In all three tests, the Nylon 12 formed a tough, abrasion and corrosion resistant coating which strongly adhered to the steel tube outer surface.

Example II

A $3/16$ inch brazed steel tube had a GALFAN and phosphate coating as noted in Example I, with an additional chromate wash, with the chromate wash having essentially no remaining weight. A first polymeric layer was applied to the surface treated tube, the layer consisting essentially of 20% SURLYN 8528 and 80% Nylon 12. Two subsequent layers of Nylon 12 were then applied. The total thickness of the three polymeric layers ranged between about 0.005 inch to 0.010 inch. The three layers formed a tough, abrasion and corrosion resistant coating which appeared to more strongly adhere to the steel tube outer surface than did the application of Nylon 12 as outlined in Example I.

Example III

A $3/16$ inch brazed steel tube has a GALFAN coating of between about 36–95 g/m$^2$ and a phosphate coating of 120–250 mg/ft$^2$. A first layer of SURLYN 8528 is applied thereto. In a subsequent layer, 20% SURLYN 8528 and 80% Nylon 12 is applied. As an outer layer, Nylon 12 is applied. The three layers form a tough, abrasion and corrosion resistant coating which strongly adheres to the steel tube outer surface.

Example IV

A $3/16$ inch brazed steel tube has a GALFAN coating of between about 36–95 g/m$^2$ and a phosphate coating of 120–250 mg/ft$^2$. A first layer of 20% SURLYN 8528 and 80% Nylon 12 is applied. A second layer of Nylon 6 (zinc chloride resistant) is applied. A third layer of ethylene vinyl alcohol is applied. A fourth layer of Nylon 6 (zinc chloride resistant) is applied. A fifth layer of a blend of Nylon 6 (zinc chloride resistant) and Nylon 12 is applied. A sixth, outer layer of Nylon 12 is applied. The six layers form a tough, abrasion and corrosion resistant coating which strongly adheres to the steel tube outer surface.

Example V

Each of the tests contained in the above Examples are also performed on $5/16$ inch welded steel tubes and $3/8$ inch welded steel tubes, and give the same results noted above.

Example VI

A 5/16 inch welded steel tube had no surface treatment. Applied thereto was a coating of 0.005 inch to 0.010 inch Nylon 12. In a subsequent test, two layers of Nylon 12 having a total thickness between about 0.005 inch to 0.010 inch were also applied. In another subsequent test, three layers of Nylon 12 having a total thickness between about 0.005 inch to 0.010 inch were also applied. In all three tests, the Nylon 12 formed a decorative coating surrounding the steel tube outer surface.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A process for manufacturing a metal tube having an interior surface resistant to interaction with materials to be conveyed therethrough, the method comprising:

positioning a length of preformed non-reactive tube composed of essentially solidified material having an external surface and a predetermined outer diameter within an inner diameter of a metal tube of essentially corresponding length, the metal tube having an unsealed side seam, wherein the inner diameter of the metal tube is greater than said outer diameter of the non-reactive tube;

sealing the side seam and reducing the metal tube to an outer diameter essentially equal to the predetermined outer diameter of said preformed non-reactive tube after said length of non-reactive tubing has been positioned within said inner diameter of the metal tube; and extruding multiple layers of a melt-processible thermoplastic including at least a first polymeric layer and a second polymeric layer onto the external surface of the reduced metal tube, wherein the first polymeric layer is selected from the group consisting of a thermoplastic elastomer, an ionomer, a nylon, a fluoropolymer, and mixtures thereof, and the second polymeric layer is selected from the group consisting of a nylon, thermoplastic elastomer, a fluoropolymer, and mixtures thereof.

2. The process of claim 1 further comprising the step of:

maintaining the non-reactive tube at a location within the metal tube opposed to the side seam during the sealing step, wherein the inner diameter of the unsealed metal tube is at least 30% greater than the outer diameter of the non-reactive tubing.

3. The process of claim 2 wherein the step of sealing and reducing the metal tube comprises sealing the metal having a first outer diameter $D_1$ while the tube is moving at a first rate $R_1$ and reducing the metal tube to a final outer diameter $D_2$ less than the first diameter $D_1$ while the tube is moving at a second rate $R_2$, the second rate $R_2$ greater than the first rate $R_1$ wherein the diameter reduction is proportional to said second rate.

4. The process of claim 3 wherein the step of positioning comprises positioning the non-reactive inner tube having an outer diameter essentially equal to the final outer diameter $D_2$ in the unsealed metal tube at a rate approximately equal to the second rate $R_2$, the unsealed tube travelling at a rate essentially equal to the second rate $R_2$.

5. The process of claim 4 wherein the reducing step comprises successively exposing the sealed metal tube to progressively narrower roller forming units.

6. The process of claim 4 wherein the non-reactive inner tube is composed of a polymeric material selected from the group consisting of polyamide resins, polytetrafluoroethylene resins, and mixtures thereof, and is positioned in a continuous manner into said unsealed metal tube through the unsealed side seam.

7. The process of claim 6 wherein the non-reactive inner tube has a wall thickness less than about 0.005 inch.

8. The process of claim 1 further comprising the steps of:

after the sealing and reducing step, coating the exterior surface of the metal tube with a zinc-based coating selected from the group consisting of zinc, zinc-nickel alloy, zinc-cobalt alloy, zinc-aluminum alloy, and mixtures thereof.

9. The process of claim 8 further comprising the step of:

sealing the zinc-based coating on the metal tube with at least one sealant coating selected from the group consisting of phosphate surface treatment compositions, chromate surface treatment compositions, zinc-aluminum surface treatment compositions and combinations thereof.

10. The process of claim 8 comprising the steps of:

after coating the metal tube with the zinc-based coating composition, heating the metal tube to a temperature between about 177° C. and about 232° C., the heating step occurring prior to the extruding step; and wherein the extruding step comprises co-extruding a first melt-processible thermoplastic material and a second melt-processible thermoplastic material onto the heated metal tube such that the first thermoplastic material forms a first layer overlying the exterior surface of the metal tube and the second thermoplastic material forms a second layer overlying the first layer, wherein the first layer has as a major constituent an ionomer consisting essentially of methacrylic acid copolymer partial metal salt and the second layer is selected from the group consisting of Nylon 12, Nylon 6, zinc chloride resistant Nylon 6, thermoplastic elastomers, fluoropolymers, and mixtures thereof.

11. The process of claim 10 wherein the extrusion step further comprises:

applying vacuum pressure between the external metal surface of the tube and the first and second melt-processible thermoplastic materials during coextrusion to draw the first melt-processible thermoplastic into intimate contact with the external surface of the metal tube.

12. A process for manufacturing a lined metal tube comprising the steps of:

inserting a length of preformed tube composed of essentially solidified polymeric material having a predetermined outer diameter into an inner diameter of a metal tube of essentially corresponding length, the metal tube having an external surface having a zinc-based coating present thereon, an unsealed side seam, and an inner diameter at least 30% greater than the predetermined outer diameter of the polymeric tube, the metal tube travelling at a first rate and the polymeric tube being inserted travelling at a second rate greater than the first rate;

after insertion of the preformed polymeric tube into the metal tubing, welding the unsealed side seam while maintaining the preformed polymeric tube at a location within the metal tube distant from the side seam during the welding step; and reducing the metal tube after welding to an outer diameter essentially equal to the predetermined outer diameter of the polymeric tube; and extruding multiple layers of a melt-processible thermoplastic to the external surface of the metal tube;

wherein the polymeric tube is maintained in tension relative to the metal tube during the sealing step, the tension being sufficient to orient said polymeric tubing material relative to the metal tube.

13. The process of claim 12 wherein the polymeric tube is positioned in a continuous manner into the unsealed metal tube through the unsealed side seam.

14. The process of claim 12 wherein said polymeric tube material consists essentially of a polymer selected from the group consisting of polyamide resins, polytetrafluoroethylene resins, and mixtures thereof.

15. The process of claim 12 further comprising the step of:

sealing the external surface of the metal tube having a zinc based coating with at least one sealant coating selected from a group consisting of phosphate surface treatment materials, chromate surface treatment materials, zinc-aluminum alloy surface treatment materials, and combinations thereof.

16. The process of claim 12 further comprising the steps of:

coating at least the external surface of the metal tube with a zinc based coating selected from a group consisting of zinc, zinc-nickel alloy, zinc-cobalt alloy, zinc-aluminum alloy, and mixtures thereof; and sealing the zinc based coating on the metal tube with at least one sealant coating selected from a group consisting of a phosphate surface treatment, a chromate surface treatment, a zinc-aluminum alloy surface treatment, and combinations thereof.

17. The process of claim 12 wherein the extruding step further comprises the steps of:

coextruding a first melt-processible thermoplastic layer and a second melt-processible thermoplastic layer on to the external surface of the metal tube with the first layer overlying the metal tube and the second layer overlying the first layer, wherein the first layer is a blended material selected from a group consisting of Nylon 12, Nylon 6, zinc chloride resistant Nylon 6, thermoplastic elastomers, fluoropolymers, and mixtures thereof in combination with an ionomer, and the second layer is selected from a group consisting of Nylon 12, Nylon 6, zinc chloride resistant Nylon 6, thermoplastic elastomers, fluoropolymers, and mixtures thereof.

18. The process of claim 17 further comprising the step of:

heating the metal tube to a temperature in a range of between 177° C. to 232° C. inclusive immediately prior to extruding multiple layers of a melt-processible thermoplastic onto the exterior surface thereof.

19. The process of claim 18 wherein the extruding step further comprises the step of:

applying vacuum pressure between the pretreated metal tube and the melt processible thermoplastic, the vacuum pressure being sufficient to draw the melt-processible thermoplastic into intimate contact with the pretreated metal tube.

20. A process for manufacturing a lined metal tube comprising the steps of:

coating at least the external surface of a metal tube having an inner diameter and an unsealed side seam with a zinc based coating material selected from the group consisting of zinc, zinc-nickel alloy, zinc-cobalt alloy, zinc-aluminum alloy, and mixtures thereof;

sealing the zinc based coating on the metal tube with at least one sealant coating selected from the group consisting of a phosphate surface treatment, a chromate surface treatment, a zinc-aluminum alloy surface treatment, and combinations thereof;

inserting a length of preformed polymeric tube having a predetermined outer diameter into the inner diameter of the metal tube of essentially corresponding length, the metal tube having an unsealed side seam and an inner diameter at least 30% greater than the predetermined outer diameter of the polymeric tube, the metal tube travelling at a first rate and the preformed polymeric tube being inserted at a second rate greater than the first rate;

after insertion of the preformed polymeric tube into the metal tube, welding the unsealed side seam while maintaining the preformed polymeric tube at a location within the metal tube distant from the side seam during the welding step; and reducing the metal tube to an outer diameter essentially equal to the predetermined outer diameter of the preformed polymeric tube; and extruding multiple layers of a melt-processible thermoplastic to the external surface of the metal tube;

wherein the preformed polymeric tube is maintained in tension relative to the metal tube during the sealing step, the tension being sufficient to orient said polymeric tubing material relative to the metal tube.

21. The process of claim 20 wherein the polymeric tube is positioned in a continuous manner into the unsealed metal tube through the unsealed side seam, and the polymeric tube consists essentially of a polymer selected from the group consisting of polyamide resins, polytetrafluoroethylene resins, and mixtures thereof.

22. The process of claim 20 wherein the extruding step further comprises the steps of:

heating the pretreated metal tube to a temperature in a range of between 177° C. to 232° C. inclusive prior to extruding;

coextruding a first melt-processible thermoplastic layer and a second melt-processible thermoplastic layer on to the external surface of the metal tube with the first layer overlying the metal tube and the second layer overlying the first layer, wherein the first layer is a blended material selected from a group consisting of Nylon 12, Nylon 6, zinc chloride resistant Nylon 6, thermoplastic elastomers, fluoropolymers, and mixtures thereof in combination with an ionomer, and the second layer is selected from a group consisting of Nylon 12, Nylon 6, zinc chloride resistant Nylon 6, thermoplastic elastomers, fluoropolymers, and mixtures thereof; and applying vacuum pressure between the pretreated metal tube and the first and second melt-processible thermoplastic layers during extrusion, the vacuum pressure being sufficient to draw the first thermoplastic layer into intimate contact with the pretreated metal tube.

* * * * *